United States Patent [19]

Schild et al.

[11] 4,097,906
[45] Jun. 27, 1978

[54] INTER-RECORD GAP RECORDING OR PLAYBACK APPARATUS

[75] Inventors: Josef Schild, Vienna; Robert Scheiber, Wiener Neudorf; Harald Schmidt, Vienna; Josef Drasch, Vienna; Eduard Keznickl, Vienna, all of Austria

[73] Assignees: Karl Vockenhuber; Raimund Hauser, both of Vienna, Austria

[21] Appl. No.: 675,583

[22] Filed: Apr. 9, 1976

[30] Foreign Application Priority Data

Apr. 10, 1975 Austria .................................. 2746/75
Jul. 25, 1975 Austria .................................. 5795/75

[51] Int. Cl.² ............................................ G11B 27/08
[52] U.S. Cl. ..................................... 360/13; 352/92; 360/3
[58] Field of Search ............... 360/13, 3; 352/92, 236, 352/7, 10, 37

[56] References Cited

U.S. PATENT DOCUMENTS

| 3,331,927 | 7/1967 | Bounsall | 360/13 |
| 3,405,238 | 10/1968 | Hurvitz | 360/13 |
| 3,603,675 | 9/1971 | Woodruff | 352/92 |
| 3,682,363 | 8/1972 | Hull | 360/13 |
| 3,733,444 | 5/1973 | French, Jr. | 360/13 |
| 3,778,558 | 12/1973 | Wick | 360/13 |
| 3,812,530 | 5/1974 | Ikegami | 360/13 |
| 3,916,121 | 10/1975 | Stuzzi | 360/13 |
| 3,967,887 | 7/1976 | Suzaki | 352/92 |

Primary Examiner—Jay P. Lucas
Attorney, Agent, or Firm—Fleit & Jacobson

[57] ABSTRACT

The invention relates generally to the processing of a data medium, in which an additional sound sequence is recorded or mixed in gaps between sections occupied by an original recording which is to remain on the data medium.

18 Claims, 34 Drawing Figures

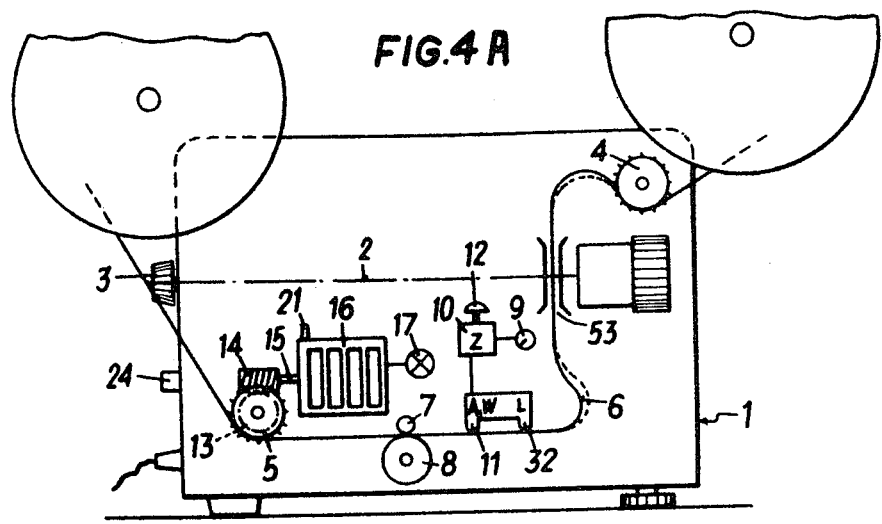
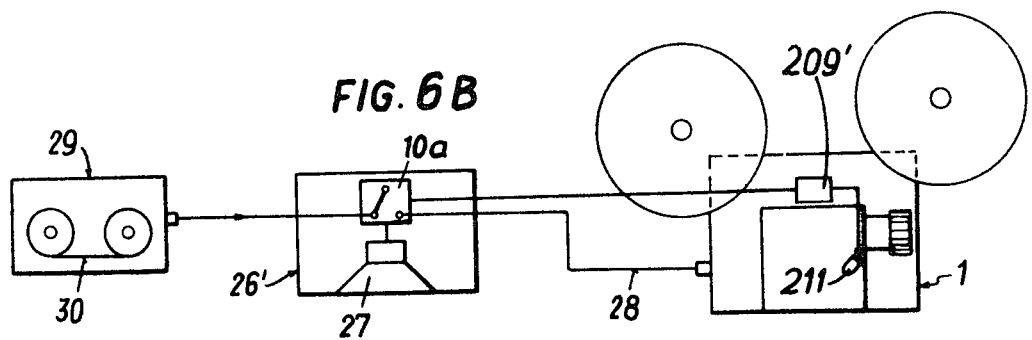

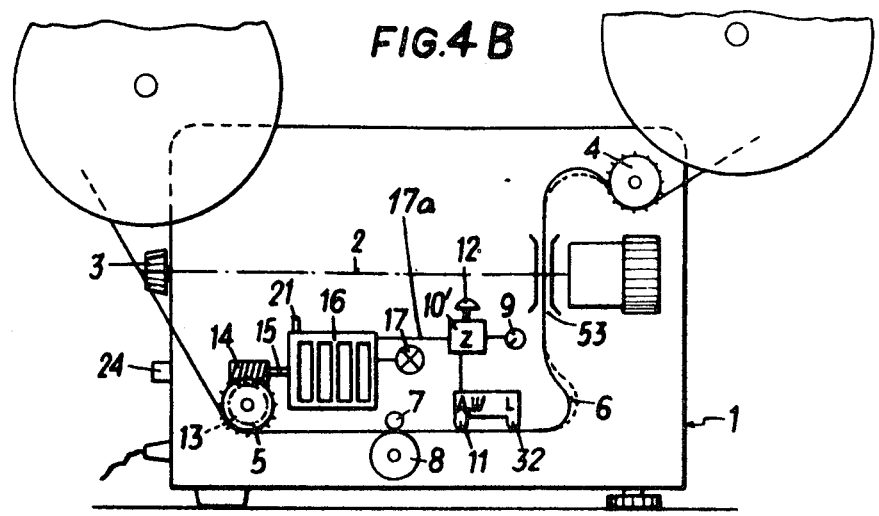
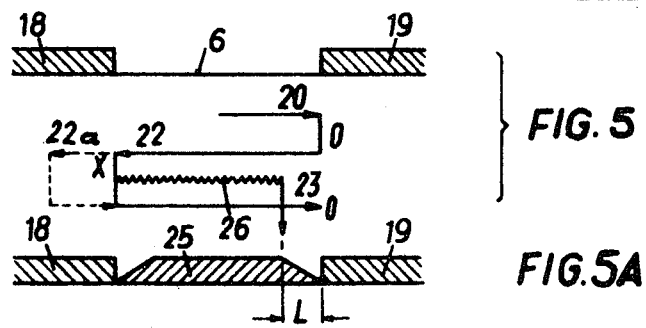
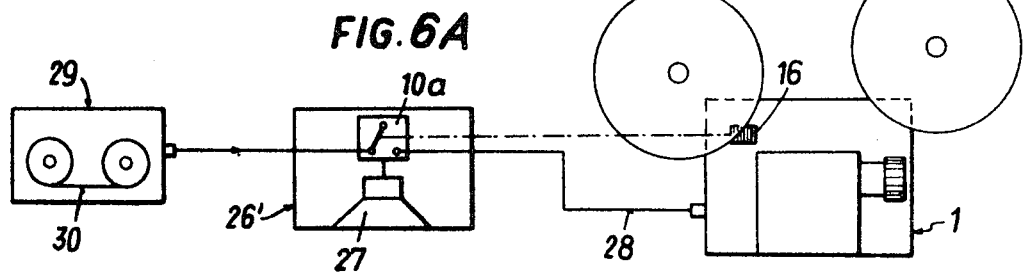

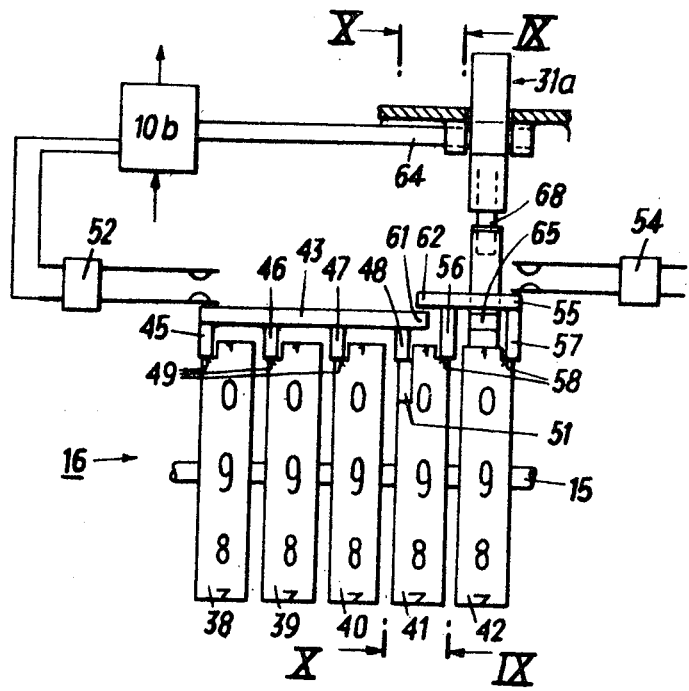
FIG. 8
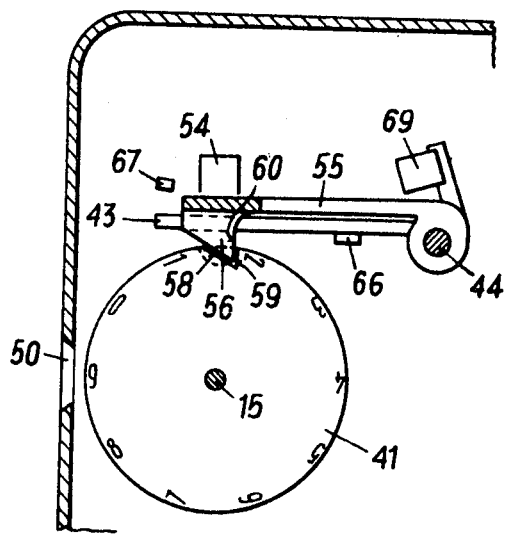
FIG. 9
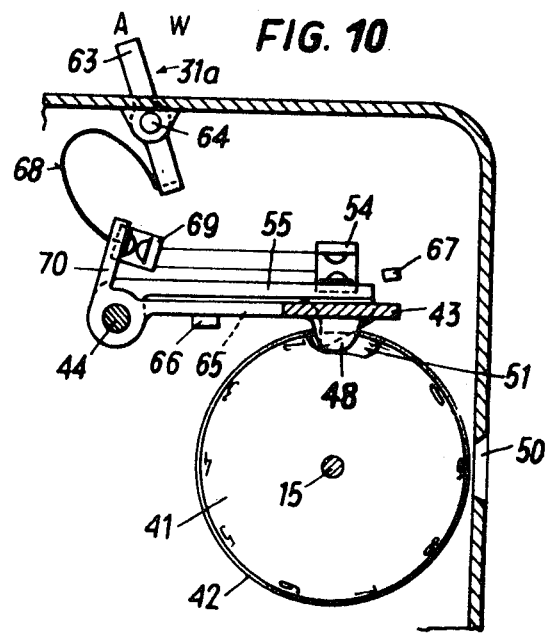
FIG. 10
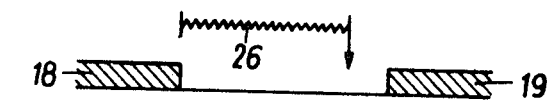
FIG. 11A
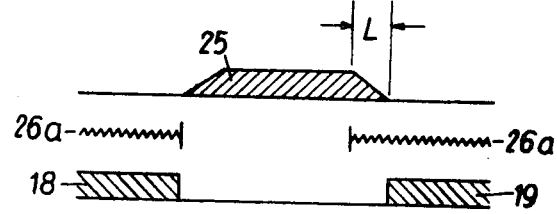
FIG. 11B
FIG. 11C

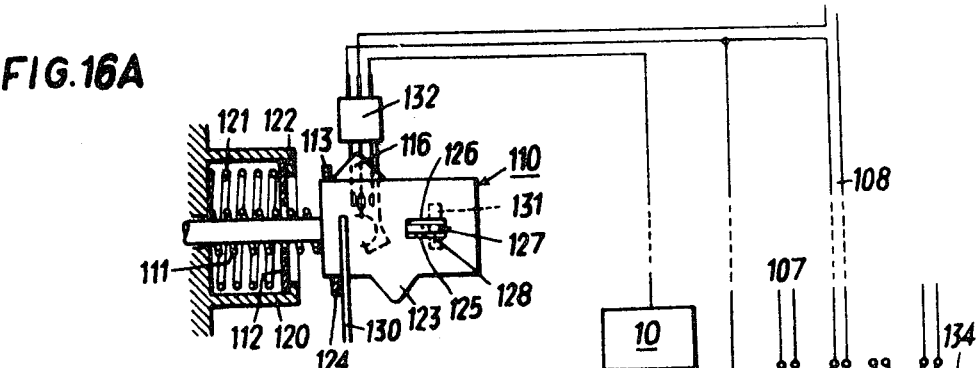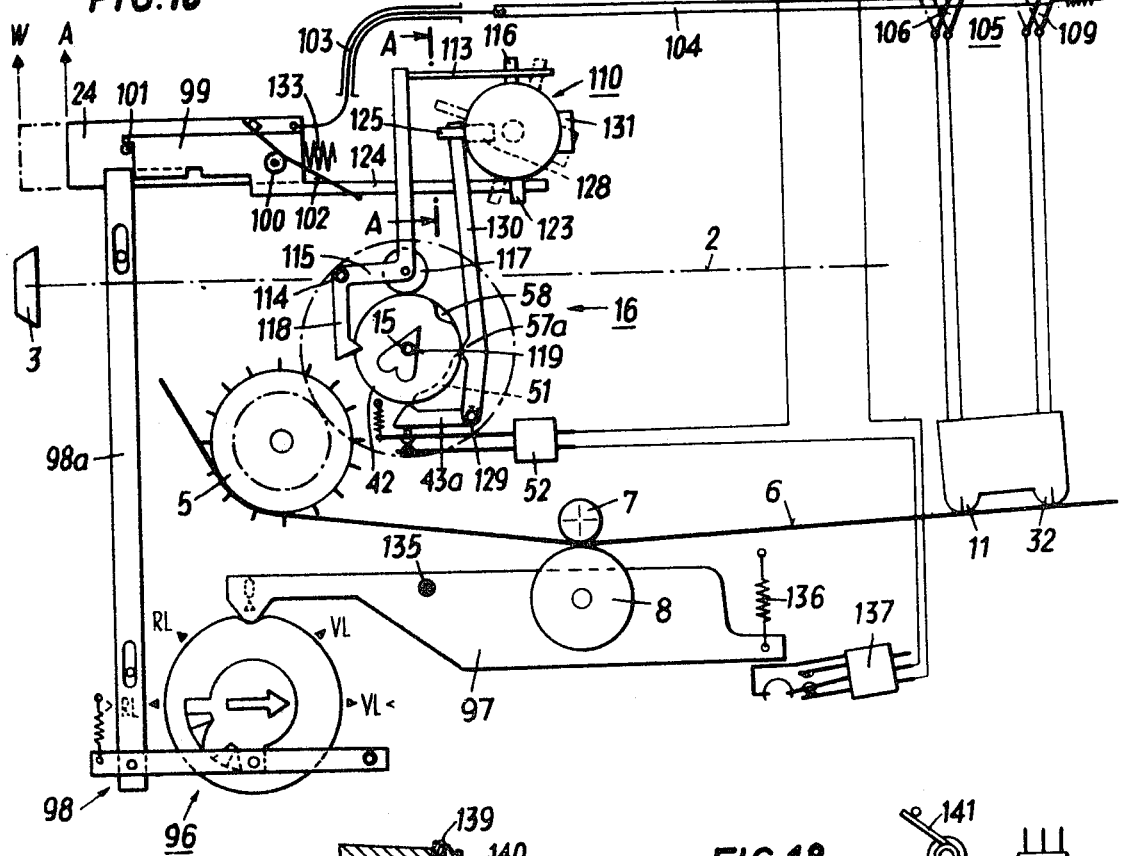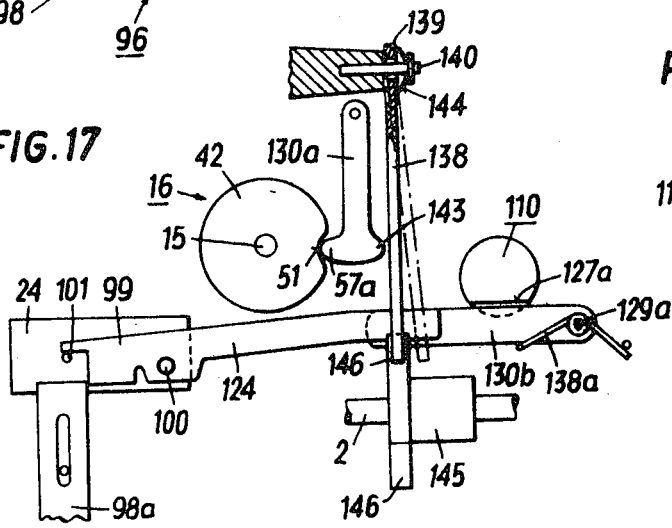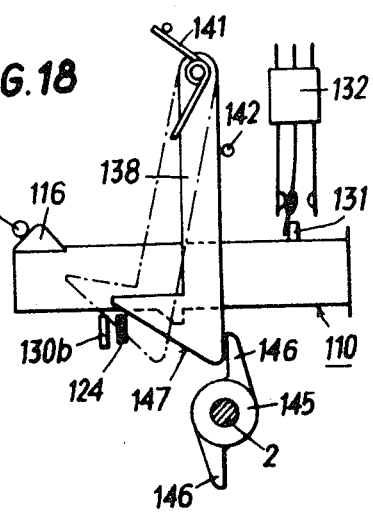

INTER-RECORD GAP RECORDING OR PLAYBACK APPARATUS

Subsequent processing is frequently necessary or desirable, more particularly when making original recordings of sound events. This applies particularly to the recording of sound films. Individual passages of the original recording frequently do not fit well into the pre-designed overall concept while other parts of the original recording must be either erased or replaced by other recordings or individual film scenes have no associated sound recording (for example recordings taken from an aquarium or the like) so that musical background or a suitable commentary must be inserted at these places. In the case of sound films such processing is generally performed on the sound projector itself. It is very difficult or requires a great deal of attention to prevent inserted sound scenes from erroneously erasing the original recording. It is known to detect the appearance of an original recording by means of a playback head and to control the recording head by means of the said playback head. However, it is occasionally necessary to modify original recordings, for example to erase noise interference which was erroneously recorded in the original recording. The above-described method fails in such cases. A method of the kind described hereinbefore has therefore already been proposed. In this method the transition, i.e. the beginning and end of the sound recording which is to remain or the free place, was marked by a brief pilot signal. Each appearance of a pilot signal then resulted in corresponding changeover switching. The fact that the pilot signal did not define the direction of changeover switching was a disadvantage of this method. The pilot signal merely meant "changeover switching" so that it was always necessary to return to the beginning if it was not clear whether changeover switching was to be performed in the "recording" or "playback" direction.

According to the invention, this problem is solved in that the pilot signal is recorded over the entire region which is to be differentiated and that the second sound sequence is mixed in or removed during the transcription of a second sound sequence with each change of region which is differentiated by the pilot signal.

Proceeding from a recording or playback apparatus for a tape-like data medium, more particularly a sound projector with at least one electromagnetic and/or electroacoustic signal transducer, for example a signal head for recording the signal on a signal track of the tape, also an erase head and with tape-conveying means which can be switched to forward and reverse running, also with means for automatically selecting specific operating modes of the apparatus, controlled by at least one counter which controls the setting means after a predefined tape length has passed through, the apparatus according to the invention is characterized in that to fade-in a sound sequence between two specified sound sequences the counting mechanism drives a signal generator to deliver a positive or negative signal which switches on a fading device at a predefined length section before the full specified length of the tape has run through. The term "signal generator" refers to any means capable of producing a positive or a negative signal. In other words, at a predefined length section prior to the running through of a full specified length of tape a signal is to be given (positive signal) or a signal which was given hitherto is to be interrupted (negative signal). This signal is to be given at a specified dimension prior to reaching the preset counter position and therefore prior to the running through of the full tape length, and is used to switch on a fading device. In the simplest case, this is a signal given to the user of the apparatus instructing him to switch on the fading-out device. However, it is advantageous for this procedure to be automated.

According to another aspect, apparatus according to the invention — based on a recording or playback apparatus for a tape—like data medium, more particularly a sound projector, with at least one head for recording a signal on a signal track of the tape, with a tape transport device which can be switched for forward and reverse run and with a setting device for the automatic setting of specified operating modes of the apparatus, said setting device being controlled by at least one counting mechanism which drives the setting device after a specified tape length has passed through, characterized in that to fade-in a sound sequence between two specified sound sequences the setting device, controlled by the counting mechanism, comprises a switch-off device only for the signal of the signal transducer whereas the tape feed is uninterrupted after the signal is switched off. Accordingly, after the head signal is switched off the tape continues to be fed without interruption - the apparatus being advantageously switched to playback operation so that a general impression is retained for the listener — so that the transfer from scene to scene, more particularly in the case of film performances, can be more readily checked and the next place at which fading-in is to be performed is in every case rapidly reached.

Further aspects and details of the invention are disclosed in the description hereinbelow of embodiments which are diagrammatically illustrated in the drawing.

Figure 3A:
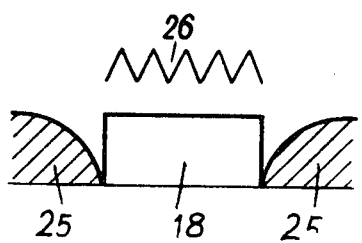

FIGS. 3A, B show in diagrammatic form different recording facilities.

FIG. 4A shows a simplified embodiment according to the invention.

FIG. 4B is a modification thereof. The procedure is explained by means of an apparatus according to the invention in the course of the sound recording by reference to FIGS. 5, 5A.

FIGS. 6A, 6B and 7 show further embodiments according to the invention and

FIGS. 8 to 10 show details of another embodiment,

FIGS. 9 and 10 being sections along the lines IX—IX or X—X of FIG. 8. The method of operation of another apparatus according to the invention is explained by reference to FIGS. 11A to 11C.

Figure 12:
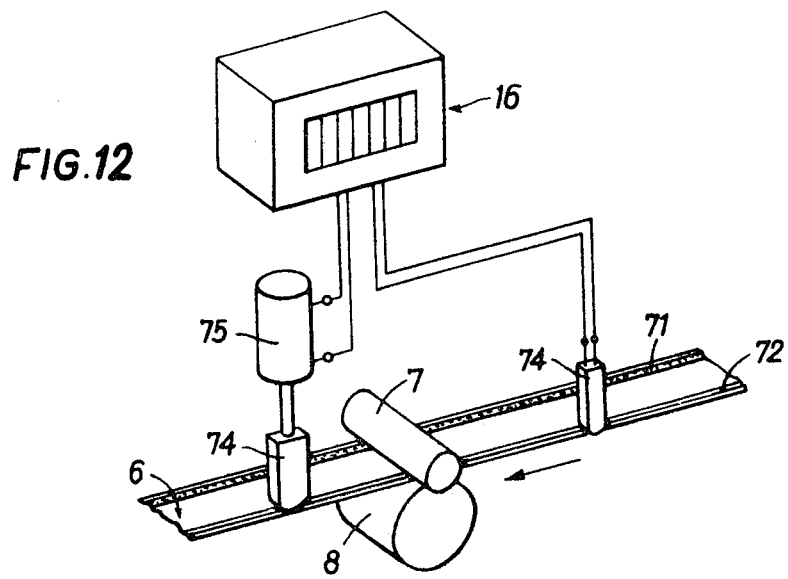
Figure 13A:
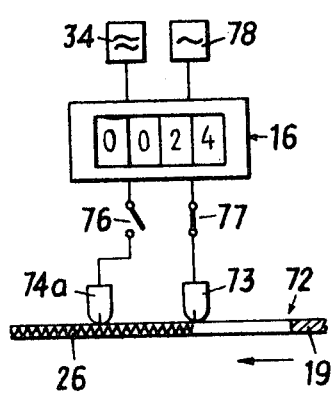
Figure 13B:
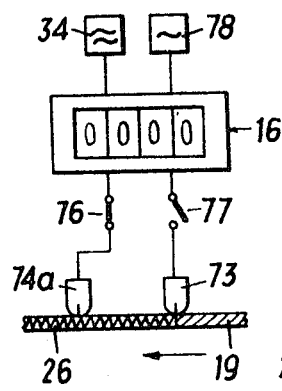
Figure 13C:
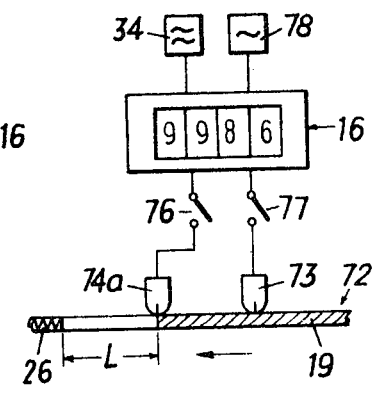

FIG. 12 is a modified embodiment the operation of which is shown by reference to FIGS. 13A to 13C.

Figure 14:
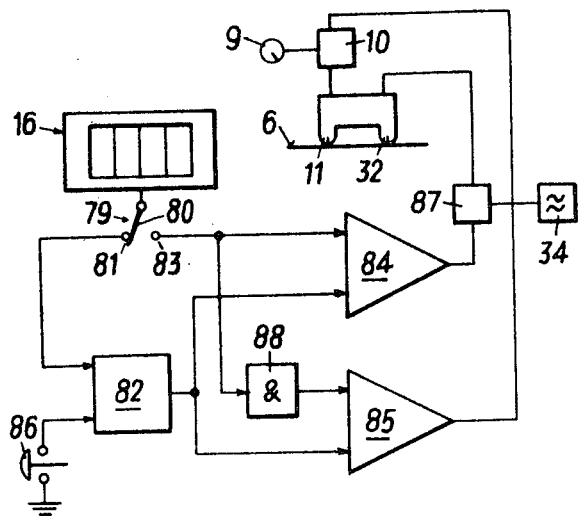

FIG. 14 is a circuit diagram of another embodiment and

Figure 15:
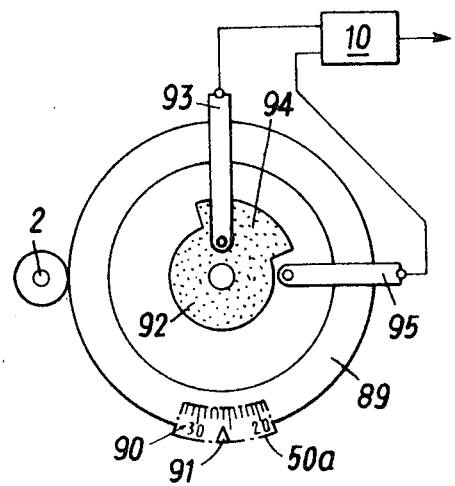

FIG. 15 is a simplified counting mechanism for the purpose of the invention.

Further details of different embodiments are explained by reference to FIGS. 16 to 18.

Figure 19:
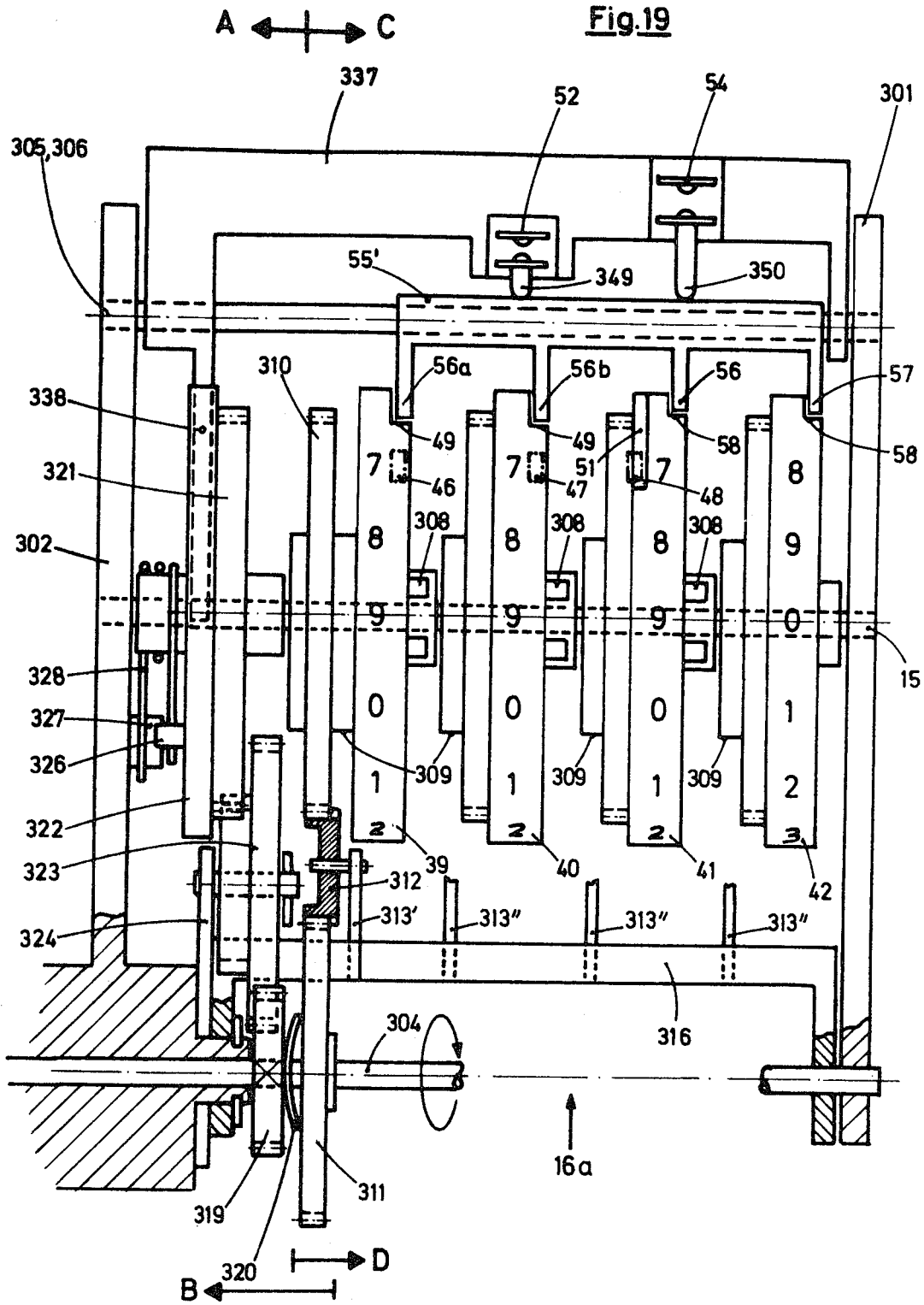
Figures 20, 20A:
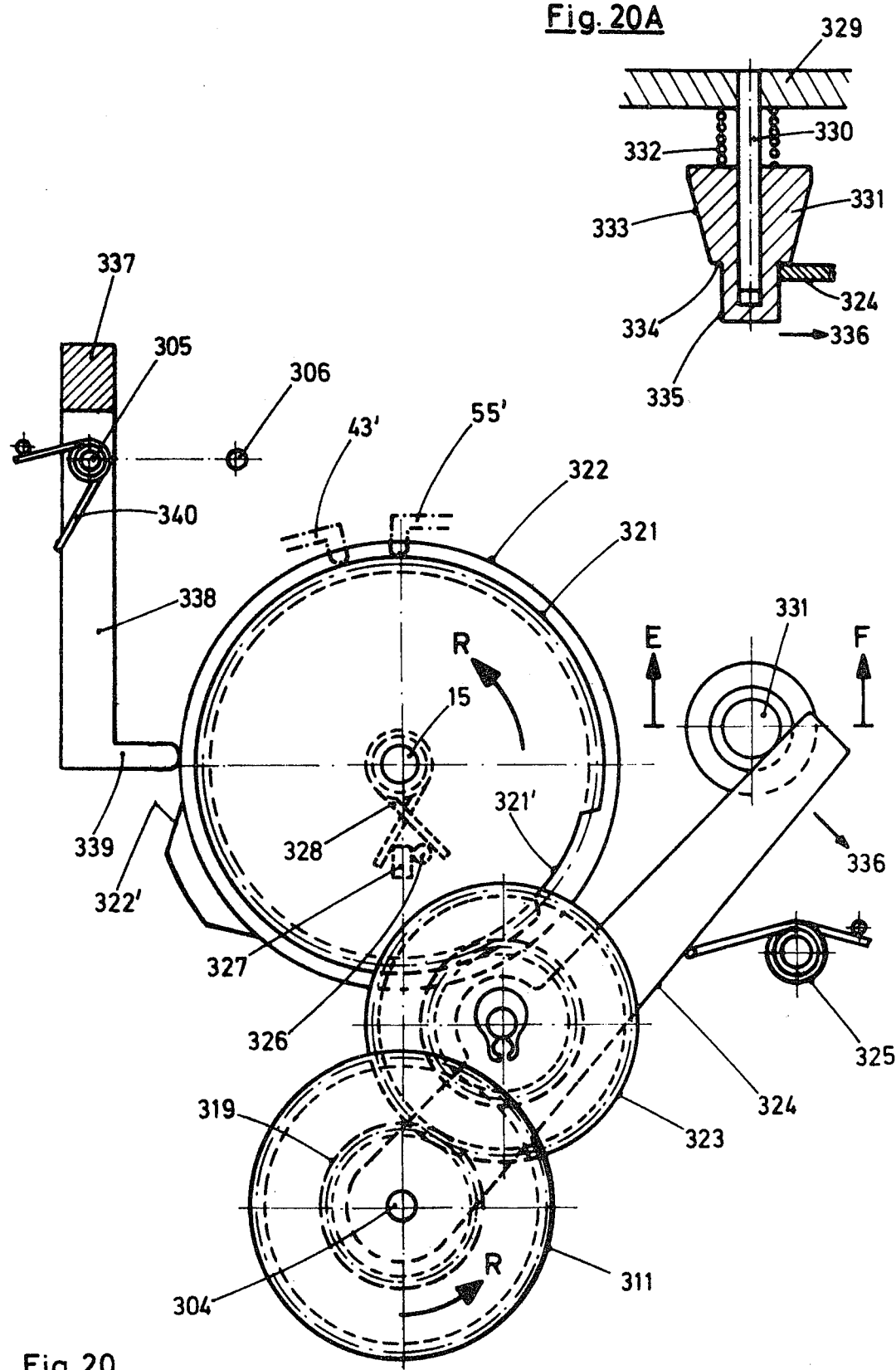
Figure 21:
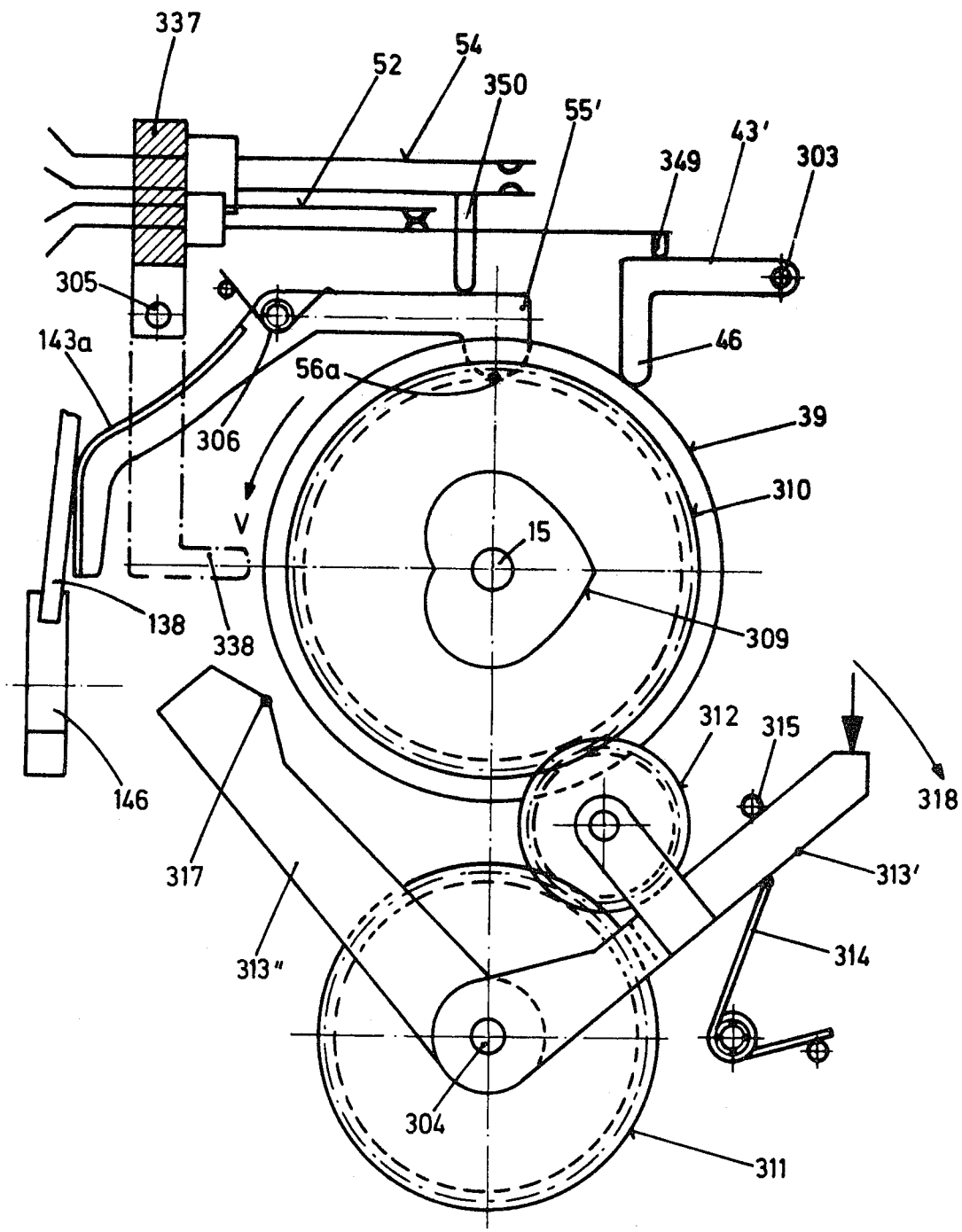
Figure 22:
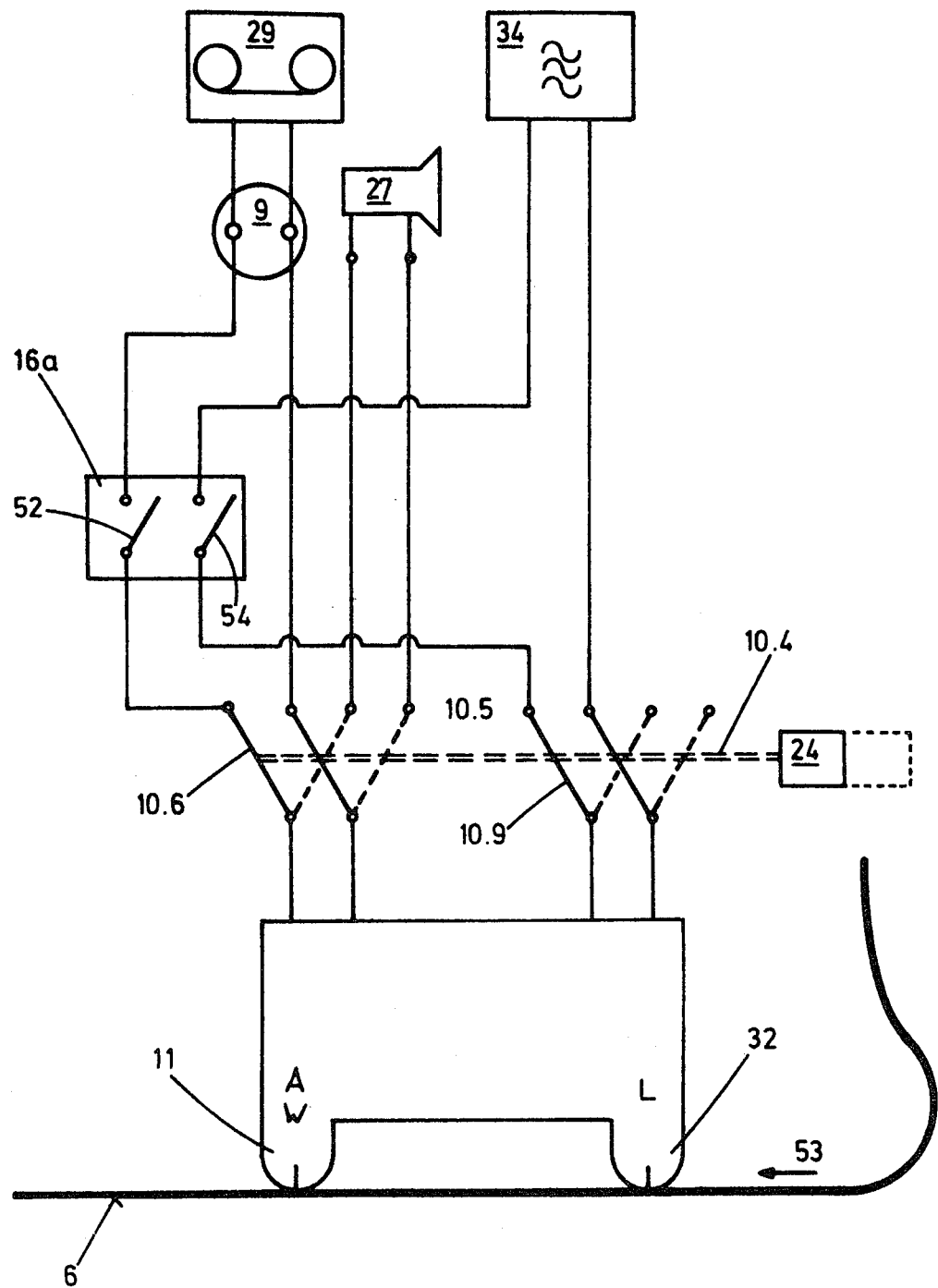

FIG. 19 is an elevation of another counting mechanism according to the invention, FIG. 20 being a side view thereof in the direction of the arrows A-B of FIG. 19 and FIG. 20A shows a detail in section, FIG. 21 being a side view in the direction of the arrows C-D of FIG. 19 and FIG. 22 is a schematic circuit diagram illustrating the insertion of the counting mechanism according to the invention into the circuits of a recording apparatus.

Figure 23:
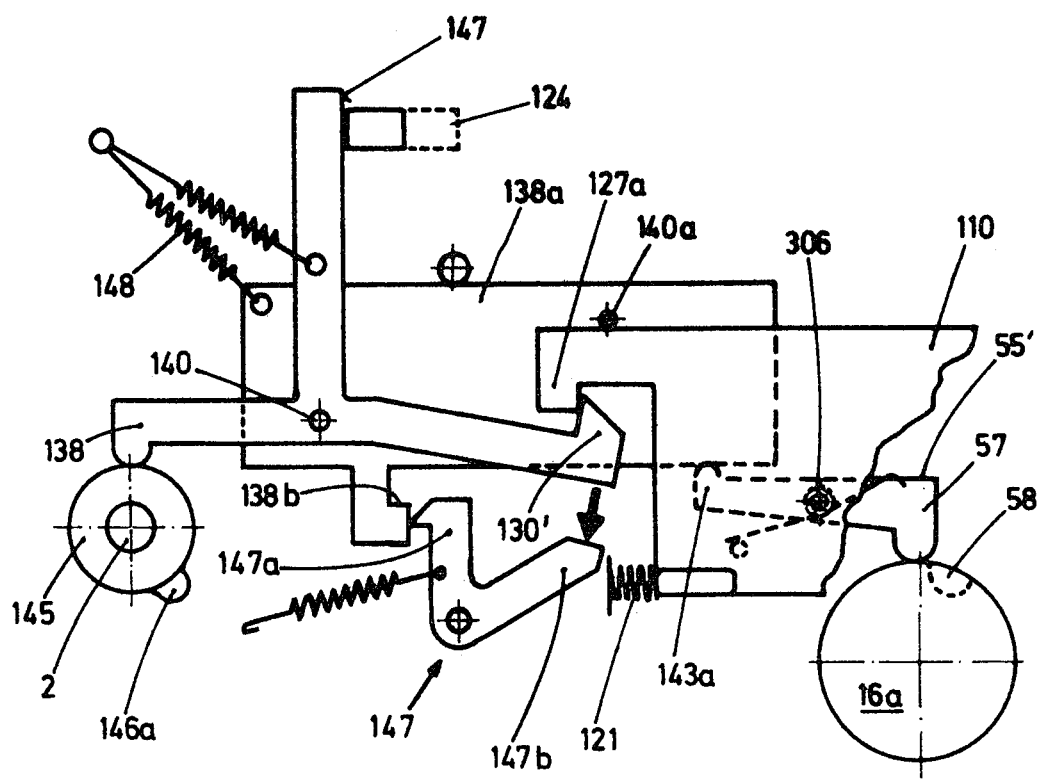

FIG. 23 is an alternative of the embodiment according to FIGS. 17, 18.

Figure 1A:
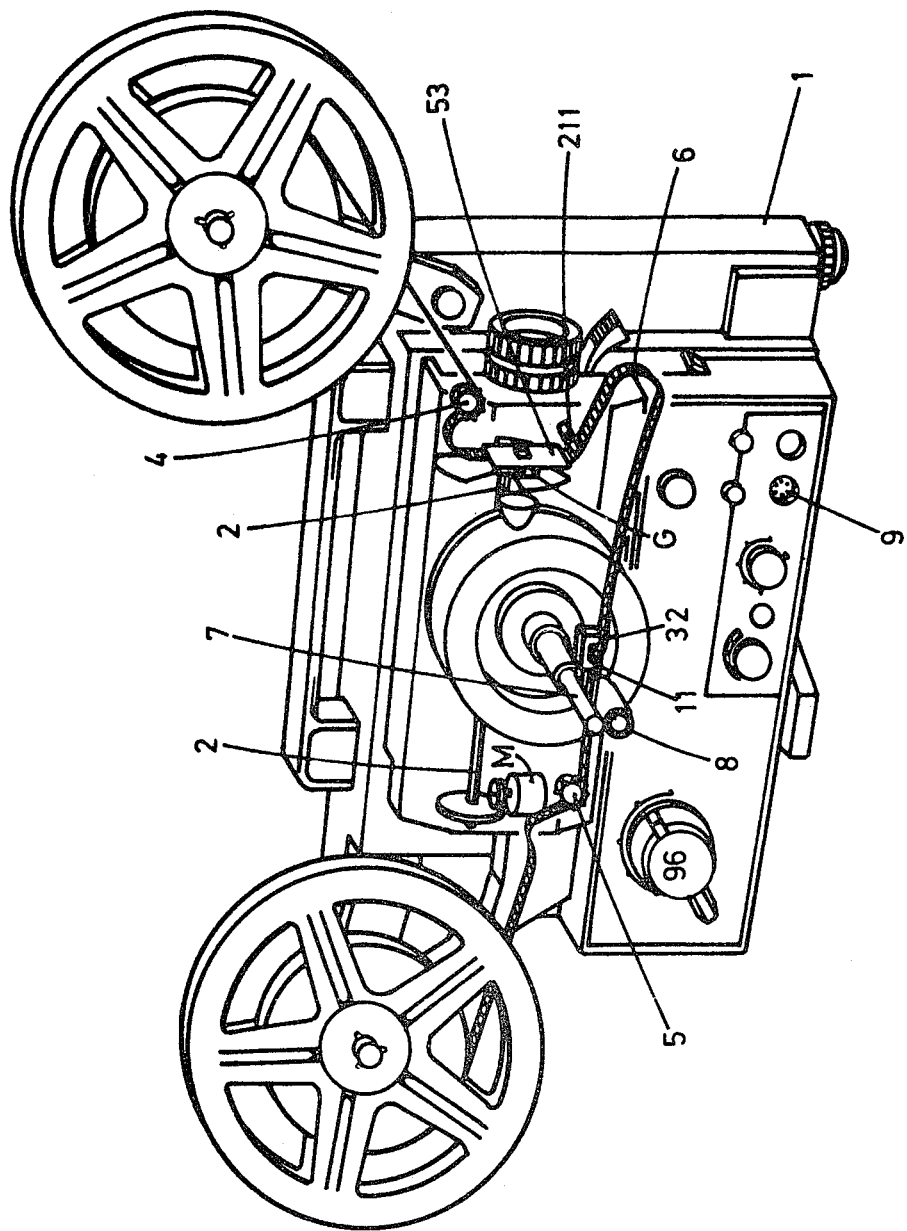
FIG. 1A shows a sound projector constructed in accordance with the invention.

FIG. 1A shows the arrangement of different components which are provided on a narrow-gauge sound projector and will be described below.

Figure 3B:
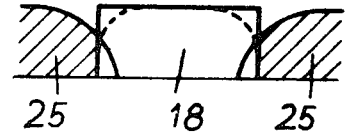

A film 6 (FIG. 1B) contains a sound track 71 and a compensating track 72. The sound track 71 contains a block, for example a block 18 (FIG. 3A, 3B) carrying an original recording. It is desired to insert an additional recording for example a musical background 25, before and after the originally recorded block 18. The block of original recording 18 however must not be erased.

The recording 25 which is to be faded-in is supplied via a microphone, a sound recording medium or the like 206 (FIG. 1) to an electric signal input 207. A high-frequency oscillator 208 is also provided for biasing. The input signal is applied by way of a variable gain amplifier 209 to a recording head 210.

The gain of the amplifier 209 is controlled by the output signal of a playback head 211 to prevent the original recording 18 being lost. As soon as the presence (or absence) of a pilot signal 26 is detected by the playback head 211, the output signal thereof adjusts the amplifier 209 so that, with the exception of a basic level which could be zero level, no further signal is supplied to the recording head 210. As can be seen, both heads 210, 211 are situated relatively close to each other so that the output of the playback head 211 is able to reset the amplifier 209 practically immediately without causing any gap in the recording. Depending on the time constant and on the control characteristics, the fresh recording 25 will directly adjoin the original recording 18, or — as illustrated in FIG. 3A — it will first be attenuated whereupon the original recording 18 is retained in its full strength. It is also possible to gradually fade-in the original recording 18 by slightly reducing the level at the beginning and end as indicated in broken lines in FIG. 3B. According to FIG. 3B, it is also possible to obtain a blending effect. To obtain all these effects, which are known, it is merely necessary for the appropriate phase relationship of the two recordings 18, 25 to be set by means of a suitable timer or to define the time constant for resetting the final control element 209 by means of a second timer so that the rise or fall of the level of the recording 25, as shown in FIG. 3A, takes place more or less gradually.

It is known to detect the presence or absence of an original recording 18 from the playback head 211 and in the case of an absence of such a level to allow a signal 25 to pass automatically to the recording head 211. The disadvantage of such an automatic system is due to the fact that it is unable to distinguish between absence of a signal 18 and an accidental pause nor between the presence of an original recording and a high level noise. These disadvantages are avoided through marking by means of a pilot signal whose presence or absence serves to determine the permissible times of addition of the sound recording.

The amplifier 209 may be switched manually and an indication given to the operator as to the presence of the pilot signal. In such a case the distance between the heads 210, 211 should allow for the reaction time of the operator and is preferably adjustable for adaptation to the reaction times of individual operators.

Figure 2:
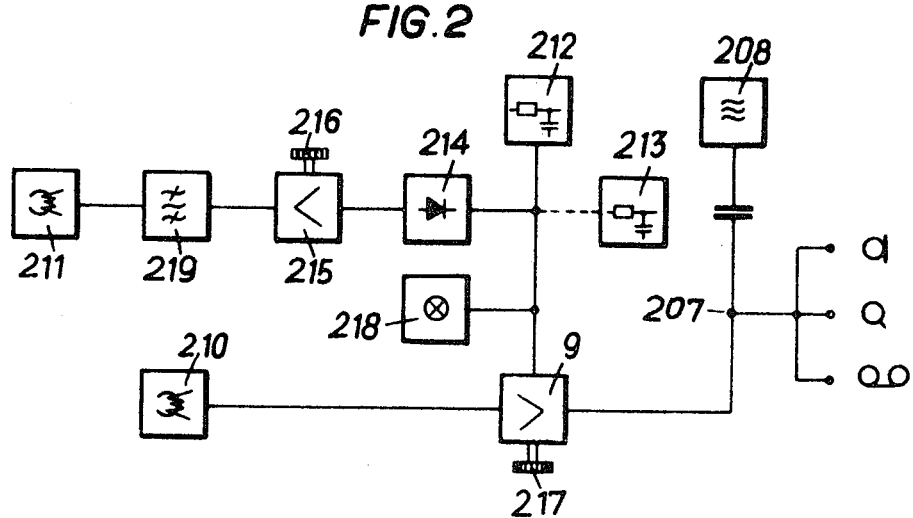

FIG. 2 shows a modification in which corresponding parts have been allocated the same reference numerals. As already mentioned, two timing circuits can be used to blend the two recordings 18, 25 into each other but if suitably arranged the circuit can comprise a single timing circuit 212. A second timing circuit 213 is connected to the circuit in broken lines, and may be used for example to achieve a smooth control characteristic for the variable amplifier 209.

The alternating voltage obtained from the playback head 211 is suitably rectified in a rectifier 214 which may consist simply of a diode. The rectifier 214 is preceded by an amplifier 215 which is provided with means 216 for setting the operating limit of the control voltage for the amplifier 209. The amplifier 209 is provided in like manner with means 217 for adjusting the level for the recording 25 so that even in the presence of a pilot signal it is possible to record a low level musical background. The output of the playback head 211 is connected to optical display means 218, for example a light-emitting diode, to indicate to the user of the apparatus visually the appearance of the original recording 18 on the sound track 71 while the film 6 is in motion.

In FIG. 2, a band pass filter 219 whose function it is to improve the signal-to-noise ratio is connected to the output of the playback head 211. Since the signals obtained from the playback head 211 are used only for control purposes they are not required to have a high quality. The playback head 211 may therefore be of a very simple construction. As shown in FIG. 1A, the head can also be situated in the region in which the film 6 is transported in steps by means of a claw G, thus providing the advantage of particularly powerful signals. However, if the head 211 is situated in the region in which the film is continuously transported, for example near heads 11, 12, it is possible for the noise to be substantially reduced.

The pilot signal 26 (FIG. 3A) is recorded in the region corresponding to the original recording 18 prior to recording of the additional sound sequence which is to be faded-in. This recording of the pilot signal can either be made in the camera or in the course of further processing. As may be seen by reference to FIG. 3A, it is important that the pilot signal is recorded on a length of tape which corresponds to the original recording, namely either on the compensating track 72 or on the sound track 71 itself. In the first case, the playback head 211 must reproduce the signal on the compensating track 72. This is indicated in FIG. 2 by the relative offset of the heads 210, 211 with respect to each other. In the second case, however, that is to say when the pilot signal and the original recording are on the same track, the pilot signal 26 must be selected so that it does not interfere with the original recording. This can be achieved by the gaps of the heads 210, 211 being situated at right angles to each other, as is known, or by selecting for the pilot signal 26 a frequency range outside the audible region. In such a case, the band pass filter 219 serves additionally to ensure that the control of the amplifier 209 is influenced only by the pilot signal. Clearly, the bank pass filter 210 is tuned to pass only the pilot signal 26. This method is particularly advantageous in the event that a change has to be made after the additional recordings 25 have been faded-in between the original recordings 18. In this case it would normally be difficult for the end of the original recording to be reliably distinguished from the additional recordings and for the amplifier 209 to be correspondingly controlled. However, with the aid of the pilot signal 26 this can be reliably achieved so that once having been recorded, an additional section 25 can be readily erased or replaced by another recording. The optical display device 218 is also of particular importance in this case to ensure correct insertion of the new additional recording.

According to FIG. 4A, a cinematographic film projector 1 is provided with a main spindle 2, shown in dash-dot lines and driven by a motor M (FIG. 1A), the rear end of the spindle being associated with a single-frame adjusting knob 3. Two sprockets 4, 5, which in turn feed the film 6, are driven in known manner from the main spindle 2 via a gear train which is not shown in detail. A conventional drive is also provided for a sound spindle 7 on to which the film 6 is pressed by means of a pinch roller 8. The sound projector 1 is also provided with an input socket 9 through which the projector can be connected to a further sound apparatus, for example a record player or a tape recorder. The socket 9 is connected through a schematically indicated device 10 to a recording head 11. The device 10 comprises inter alia a sound fade-out device which can be switched on by operation of a control knob 12.

A pinion 13 which meshes with a worm wheel 14 is mounted on the spindle of the sprocket 5. The worm wheel 14 is mounted on a spindle 15 of a counting mechanism 16. The counting mechanism 16 is connected to a signal lamp 17 which, in the illustrated embodiment, is lit at a preset count before the zero position of the counting mechanism 16 is reached. For example, the lamp 17 is energized by a switch, not shown but provided in the counting mechanism 16, from the time of reaching the count of "20" until it reaches the zero position. The user of the sound projector 1 is therefore notified visually that the zero position will be reached shortly and that it is time to actuate the fade-out device 10 by means of the push-button 12.

In FIG. 4B, the device 10 is provided only for applying the signal from the socket 9 to the recording head 11. The film feed by means of the claw G (FIG. 1A) and by the sprockets 4, 5 continues to operate after the signal to the recording head 11 is switched off and is preferably automatically switched to playback as will be explained subsequently (FIG. 16). This permits monitoring of the transitions.

In FIG. 4B, the counting mechanism 16 is connected via a conductor 17a to the device 10 which is operated when the counting mechanism 16 reaches the zero position or earlier by an amount corresponding to the fade-out time constant if a timing circuit is provided within the device 10. The signal lamp 17 can simultaneously indicate this switching operation by optical means, a feature which is particularly advantageous if only the signal of the recording head is switched without the apparatus itself being simultaneously switched to playback operation. Often, the audio signal from the sound apparatus is inaudible during recording so that in the case of interrupted running of the film the user would not know when the switch-off device for the recording head 11 has been operated.

In practice, sound recording according to FIGS. 5, 5A can be obtained on the assumption that two predefined sound sequences 18, 19 are recorded on the film 6 and a further sound sequence is to be faded-in between the two above-mentioned sequences. First, the beginning of the sound sequence 19 is found as indicated by the arrow 20 and at this place the counting mechanism 16 is set into the zero position by depressing a zero setter 21 (FIG. 4A, 4B). The film is then allowed to run back as indicated by the arrow 22 at least until the end of the previous original sound recording 18 is reached. Where appropriate it is possible for the critical places to be exactly adjusted by means of the single-frame adjusting knob 3.

To make allowance for the start up of the apparatus it is advantageous to proceed from a place within the recording 18, as will be explained subsequently by reference to FIGS. 19 to 22.

When the end of the sound sequence 18 has been found, the counting mechanism 16 may have reached a position, for example the position X. The film 6 is then again fed forward (arrow 23), operation of a recording button 24 on the sound projector 1 (FIGS. 4A, 4B) closing the circuit from the socket 9 to the recording head 11. If the switch-off device 10 is provided with a time constant element the sound fed in via the socket 9 will be gradually faded into the sound sequence 25 which can be seen by reference to FIG. 5A, until the full recording level is reached. Fading-out by the counting mechanism 16 is appropriately initiated (in a manner to be described subsequently) at a predefined length section L prior to the full tape length having run through to the zero position of the said counting mechanism 16. The length L is dimensioned so that it corresponds to the desired time for fading-out as defined by the time constant of the circuit in the device 10. When the zero position of the counting mechanism is reached the signal of the head 11 will be completely switched off by the device 10 but the film 6 continues to run on while displaying the next film scene.

Instead of switching the recording head 11 it is possible to control the pilot signal 26 of a pilot signal head (see 73 in FIGS. 13A to 13C), said pilot signal serving for control purposes as already described by reference to FIGS. 1B to 3B. If the pilot signal 26 is recorded on the sound track 71 of the film 6 or on its compensating track 72 in the region up to the beginning of the predefined length section L, the appearance of the pilot signal (or its absence) will cause the sound sequence 25 to be faded-in when the film again runs through. The film 6 can thus be encoded at different places with the pilot signal 26 being recorded in each case between two original sound recordings whereupon a sound apparatus is connected to the socket 9 and during the second passage of the film the sound sequence from the connected sound apparatus is faded-in at the marked places of said film. The circuit according to the invention is particularly advantageous in this procedure because the film can be provided continuously with the sound sequence which is to be faded-in instead of only in separate scenes at desired places. To this end it is advantageous if, while being recorded, the pilot signal 26 is interrupted by the counting mechanism 16 prior to reaching the zero setting of said counting mechanism in order to provide time for fading-out. If this is not desired but instead a sudden transition from one sound sequence to another is desired it will be necessary for the pilot signal 26 to mark the entire space between sound sequences 18 and 19 (see FIGS. 11A to 11C).

It is not necessary that the sound sequence, which is to be faded-in and was last controlled by the counting mechanism, also be recorded by means of a recording head - such as the recording head 11 in FIGS. 4A and 4B - on the sound track of the film or on its compensating track. FIG. 6A shows another possibility in which the sound projector 1 is connected to a playback amplifier 26' with a loudspeaker 27 connected thereto. The original sound on the film can thus be supplied via an output conductor 28 to the playback amplifier 26'. A magnetic tape 30, containing the sound sequence which is to be faded-in, is provided in a tape recorder 29. The playback amplifier 26' contains a device 10a which is provided with a changeover switch. The predefined sound sequences 18 or 19 (FIG. 5) from the projector 1 and the sound sequence 25 which is obtained from the tape recorder 29 and the tape 30 and is to be faded-in, are alternately switched to a loudspeaker 27 by means of the changeover switching in the device 10a. The device 10a also appropriately contains the timing circuits to permit smooth fading-in or fading-out. As may be seen by reference to FIG. 6A, the device 10a in this case is controlled by the counting mechanism 16 in the manner already described. The advantage of this device is due to the fact that there is no risk of erasing the original recording even if the counting mechanism 16 is wrongly set. In the arrangement of FIG. 6A it is particularly advantageous to employ a device as will be described subsequently by reference to FIG. 14.

Figure 1B:
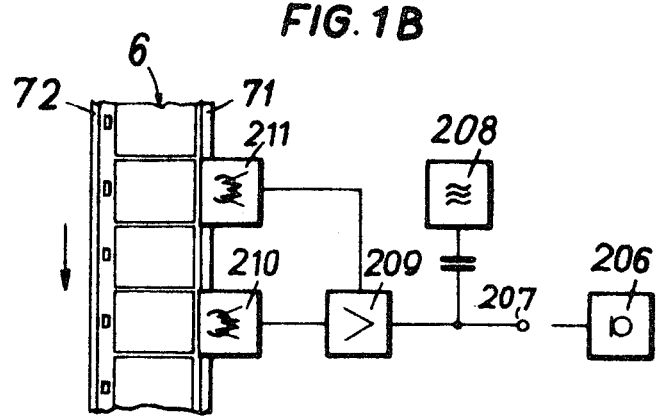
FIG. 1B shows the principle of the invention by reference to a block circuit diagram and FIG. 2 is a modified embodiment.

FIG. 6B shows an embodiment corresponding to FIG. 6A in which the changeover switch of the device 10a, as in the variable amplifier 209 of FIGS. 1B and 2, is controlled from the playback head 211 for the pilot signal 26 (see also FIG. 1A) the signal being amplified by an amplifier 209'. Erasing of the original recording is also reliably avoided in this case.

The process of controlling the playback amplifier by means of the counting mechanism 16 need not necessarily involve the use of a separate tape recorder 29. It is possible to record the sound sequence for fading-in on the compensating track of the film and to play back the predefined original sound recordings 18 or 19 and the sound sequence 25 which is to be faded-in in an alternate pattern through the playback amplifier. In each case the faded-in sound sequence 25 will be switched off at the correct time together with the appearance of the next original sound recording (19 in FIG. 5).

FIG. 7 illustrates a sound projector 1 in which the counting mechanism 16 selectively controls either playback amplifier 26' (FIG. 6A) or the head 11. In this way the sound sequence to be faded-in can first be recorded on the compensating track of the film, the original sound sequence 18, 19 (FIG. 5) being situated on the normal sound track. By setting a changeover switch 31 to control the playback amplifier, as illustrated in FIG. 7, the counting mechanism 16 will control the device 10a (FIG. 6A) the sound sequence 25 (FIG. 5) which is recorded on the compensating track of the film being first acoustically faded-in via the loudspeaker 27 until the full level is reached. At a predefined length L (see FIG. 5A) prior to reaching the zero position of the counting mechanism 16 the sound sequence 25 which is to be faded-in is again faded-out and finally, on reaching the zero position, the counting mechanism switches the device 10a from playback of the sound sequence on the compensating track of the film to playback from the normal sound track of the film whereupon the sound sequence 19 is reproduced. The same arrangement could also be embodied if the changeover switching device 10a is controlled by the pilot signal 26.

By contrast to FIG. 6A, the output of a playback head, associated with the compensating track 72 of the film 6, is also connected to the inputs of the device 10a in addition to the signal of the normal sound track 71 (FIG. 1B) of the film (in place of the output of a tape recorder 29).

Since the film feed is undisturbed by the switching operation it is firstly possible to monitor whether the transition from the sound sequence, which is to be faded-in, to the predefined sound sequences complies with said requirements but without interfering with the predefined original recording. As soon as it has been ascertained that the arrangement and design of the sound sequences complies with requirements the changeover switch 31 can be set into position "A" in which the counting mechanism 16 controls the recording head 11 together with the associated erase head 32. To this end, the erase head 32 is connected via a switch 33 to an erasing oscillator 34. The erasing oscillator circuit was interrupted while the changeover switch 31 was set in position "W" because in this operating mode erasing of the sound track region situated between the predefined sound sequences 18 and 19 (FIG. 5) is not yet desired.

The counting mechanism is provided with a switch-off device to prevent the counting mechanism 16 coming into action during normal operation of the apparatus when this is not intended and the counting mechanism approaches the zero position merely by coincidence. If the desired arrangement and location of the zero position of the counting mechanism in relation to the predefined sound sequences was determined, more particularly when the changeover switch 31 was set into position "W", this location would no longer be reproducible if the switch-off device for the counting mechanism 16 were in operation. It is therefore advantageous if the means for stopping the counting mechanism 16 are inactivate when the changeover switch 31 is in the "W" setting.

According to FIG. 7, a spindle 15 of the counting mechanism is provided with a locking disc 35 which has a cut-out 36 in a position that corresponds to the zero setting of the counting mechanism 16. A pawl 37 is able to drop into this cut-out and thus prevent the counting mechanism 16 from making any further connection. When the counting mechanism is switched on, the pawl 37 can be disengaged in a manner not shown but it is also disengaged when the changeover switch 31 is in the "W" setting so that the pawl is then no longer able to switch off the counting mechanism. With the changeover switch 31 in this position, the counting mechanism 16 therefore remains in operation so that once set, the location of the sound sequence 25 (FIG. 5) which is to be faded-in can be reproduced with respect to the predefined sound sequences 18, 19.

One practical embodiment of a counting mechanism together with the switch-off device and the changeover switch is shown in exemplified form in FIGS. 8 to 10. Although this embodiment as well as the previously described embodiments relate to a counting mechanism in which the zero position must be reached in accordance with FIG. 5, kinds of counting mechanism in which switching operations for any desired, preselectable places can be preset, as will be described by reference to FIG. 14, can also be used for the same purpose. FIG. 8 shows only five rollers 38 to 42 which are part of a roller counting mechanism 16 and are situated on the counting mechanism spindle 15 which is merely sketched. A lever 43 which is pivotable about an axis 44 and is shown in sectional form in FIG. 10 rides upon the rollers 38 to 41. The leading end of the lever 43 supports a plurality of cam followers 45 to 48 each of which co-operates with the cam surfaces of the rollers 38 to 41. Each of the cam surfaces of the rollers 38 to 40 is identically constructed and each has a place at which there is a single indentation 49 to accommodate the associated cam follower 45, 46 or 47. To this end, the indentation 49 is arranged so that the numeral 9 of each of the three rollers 38 to 40 appears in a window 50 (FIGS. 9, 10) if the cam followers 45 to 47 are situated opposite to the associated indentations 49.

However, the cam followers 45 to 47 cannot drop into the indentation 49 until the cam follower 48 is also situated opposite an identation in the cam surface of the roller 41. FIG. 10 shows the rollers 41, 42, disposed one behind the other, of which only the roller 41 is shown with a smaller diameter than the roller 42 in the interests of clarity. In actual fact, their diameters are identical. As can be seen, the roller 41 is provided with an indentation 51.

The lever 43 is therefore able to assume the position illustrated in FIG. 8 only if the first four rollers 38 to 41 of the counting mechanism 16 display the numeral sequence "99999". The lever 43 controls a switch 52 of the switch-off device, said switch being closed with the rollers 38-41 being in any position with the exception of the above-mentioned numeral sequence, but which said switch is open in the case of the last-mentioned numeral sequence. Switch 52 produces a signal which directly or indirectly fades-out the sound sequence 25 (FIG. 5) which is to be faded-in, namely at a specified length L before the full length of the film 6 has passed through when moving in accordance with the arrow 22 of FIG. 5. The signal delivered by the switch 52 controls a device, for example a device 10b, which can be constructed as a fade-out device for fading out the sound sequence 25 which is to be faded-in through the socket 9. The device 10b may also contain the generator for the pilot signal 26 which is simply switched off by opening of the switch 52. As already described, this results in the sound sequence 25, which is to be faded-in, being switched off, because the pilot signal 26 is utilized to control this sound recording during the second passage of the film. To this end, it has been found advantageous if the pilot signal is one with a frequency of approximately 20 Hz, more particularly since a signal of this kind is outside the audible range, so that the normal sound track of the film itself can be used for recording or picking off this signal. Since the pilot signal 26 is used merely for control purposes it has also been found advantageous to arrange the reading head for the pilot signal in the region of the film gate of the sound projector 1 referenced with the numeral 53 in FIG. 1A. As already mentioned, very powerful output signals are obtained because of the high velocities which occur in this region due to the intermittent action of the claw for the film.

Apart from controlling the switch 52 the counting mechanism 16, illustrated in FIGS. 8 to 10, also controls a second switch 54 of the switch-off device, said switch being connected in series with the circuit of the erase head 32 (FIG. 7). In general there is a priori no free space between the predefined sound sequences 18, 19 (FIG. 5) for fading-in in the sound sequence 25, instead undesirable noises are present at this place and are hardly avoidable in the case of original recordings. These interfering noises must therefore be erased before the sound sequence 25 is faded-in. The erase head 32 is provided to this end but must remain switched on until the full length between the two predefined sound sequences 18, 19 has passed through. The switch 54 is controlled by a lever 55, hinged on the spindle 44 and supporting two cam followers 56, 57 which co-operate with corresponding cam surfaces 58 of the rollers 41, 42. These cam surfaces 58 are basically constructed in a manner similar to those of the cam surfaces 49 because they allow the lever 55 to drop in in only one position in which the rollers 41, 42 display the numerals "99" through the window 50. The cam followers 45 to 48 have rounded sliding surfaces but at least the cam follower 57 and in the illustrated embodiment also the cam follower 56 are constructed in the form of a nose (see also FIGS. 9, 10), the cam surface 58 being provided with an abutment surface 59 which co-operates with a mating abutment surface 60 of the cam follower 56. If the arm 55 together with its cam followers 56, 57 has therefore dropped into the indented cam surfaces 58, it means that the counting mechanism 16 has been stopped because the two abutment surfaces 59, 60 prevent further rotation. The counting mechanism 16 is accordingly and appropriately driven by a suitable clutch (friction clutch, free-wheeling device or the like) which permits such stoppage. The control function of the counting mechanism 16 could also be disengaged by the switches 52, 54 being disposed on a common support, similar to the beam 337 in FIGS. 19-21 which will be described subsequently, but where said beam is associated with the changeover switch 31a, for example through the actuating lever 63, and is controlled by said changeover switch by analogy to FIG. 7.

As can be seen, the counting mechanism - which counts in the reverse direction when moving in accordance with the arrow 22 of FIG. 5 — does not directly stop in the zero position but when the counting mechanism displays "99999". The reason for this is that after the film 6 has passed through in accordance with the arrow 20 (FIG. 5), the counting mechanism is set to "zero" and must then not be stopped when running in accordance with the arrow 22. Accordingly, the zero position of the counting mechanism must be the release position. It is of course also possible to stop the counting mechanism only in the zero position and to obtain a counting mechanism display of "00001" by operating the button 21 (FIGS. 4A, 4B) after the film passes through in accordance with the arrow 20. It is merely essential that the stopping device comes into action at least in the region of the zero position.

To prevent the switch 54 being actuated in every possible position of the counting mechanism in which the two rollers 41, 42 display the numeral sequence "99" and to ensure that the switch 54 is opened only when the counting mechanism is set to the numeral sequence "99999", the two levers 43, 55 together form a device in the manner of an AND logic network. To this end, the lever 43 is provided with a projection 61 situated opposite to a mating projection 62 of the lever 55. For as long as the lever 43 together with its cam followers 45 to 48 has not yet dropped into the indentations in the cam surfaces 49 or 51, the lever 55 will be prevented from dropping into the indented cam surfaces 58 of the rollers 41, 42 even if the cam followers 56, 57 are positioned opposite to the said indentations. The lever 55 is able to drop into the cam surfaces 58 and therefore open the switch 54 of the erase circuit after the lever 43 has dropped in and the switch 52 is opened only when the illustrated "99999" position is obtained.

FIGS. 8 and 9 also show a changeover switch 31a the operation of which corresponds to the changeover switch 31 of FIG. 7. The changeover switch 31a is provided with an actuating lever 63 which is mounted on a spindle 64. By means of the spindle 64 the changeover motion of the lever 63 is transmitted to corresponding switches which are contained in the device 10b and are necessary to perform the above-mentioned function. FIGS. 8 and 9 merely show in detail how the stopping device, associated with the counting mechanism 16 and comprising the stop abutments 59, 60, is inactivated when the actuating lever 63 is changed over. To this end, a trip lever 65 is supported on the spindle 44 between the two cam followers 56, 57 and where appropriate is fixedly connected to said spindle for the purpose of transmitting the motion to further switch parts. FIG. 9 shows two stop abutments 66, 67 which have been omitted in FIG. 8 in the interests of simplicity and clarity. In the course of the changeover operation by means of the lever 63 the motion thereof is transmitted through a toggle spring 68 to the lever 65 which bears on one of the two stop abutments 66, 67. In position "A" of the operating lever 63 the lever 55 is released so that it is able to drop by means of its cam follower 56 into the indented cam surface 58. In the position "W" of the actuating lever 63 on the other hand the trip lever 65 bears on the stop abutment 67 and raises the cam followers of the lever 55 off the cam surfaces of the rollers 41, 42. The stopping device associated with the counting mechanism 16 and comprising the stop abutment surfaces 59, 60 is thus disengaged.

There must of course be no erase action if the counting mechanism 16 controls the playback amplifier 26' (FIG. 6A). Raising of the trip lever 65 and the associated rotation of the lever 55 in the anti-clockwise direction (by reference to FIG. 9) switches on the switch 54 in the circuit of the erase head 32 (FIG. 7). Erase action is nevertheless prevented because a further switch 69 (FIG. 9) is connected in series with the switch 54 and is opened by an arm 70 of the lever 65. When the playback amplifier 26' is therefore controlled by the counting mechanism the stopping device 59, 60 will be switched off on the one hand and the erase head 32 (FIG. 7) will be switched off on the other hand.

The changeover lever 63 can be connected to the lever 43 instead of the trip lever 65 because the projection 61 can also disengage the lever 55 and therefore result in the stopping device being disengaged. However, it should be noted that rotation of the lever 43 in the anti-clockwise direction (by reference to FIG. 10) also closes the switch 52 in an undesired manner so that an interrupter switch, corresponding to the switch 69, must also be connected in series with the circuit of the said switch 52.

As already mentioned by using the pilot signal 26 it is possible to clearly define those sections which are to be faded into the sound sequence 25 and thereafter for the sound sequence 25 to be faded into the appropriate places in a single recording process (instead of scene by scene). As shown by FIGS. 11A to 11C, it is appropriate for this pilot signal to cover not the entire space to be occupied by the sound sequence 25 that is to be faded-in, but instead according to FIG. 11A the pilot signal 26 for marking the space of the sound sequence 25 or according to FIG. 11C the pilot signal 26a which indicates the regions of the predefined sound sequences 18, 19, is to be offset with respect to the beginning of the sound sequence 19 by the predefined length section L which is required for fading-out the sound sequence 25. In a system according to FIGS. 1B and 2 it is therefore merely necessary to provide an additional timing element which causes slow fading-in of the sound sequence 25 or slow fading-out thereof at the end.

As already described, the switch 52 of the switching-off device according to FIG. 8 can be connected in the circuit of the pilot signal generator to switch off the pilot signal 26 at a predefined length section L prior to reaching the beginning of the subsequent predefined sound sequence 19 in order to record the pilot signal 26 in the manner already illustrated in FIG. 11A. It is however also possible to adopt the procedure described below by reference to FIGS. 12 and 13A to 13C.

The film 6 which is provided with the sound track 71 and the compensating track 72 is illustrated in FIG. 12. Although the pilot signal 26 can also be recorded on the sound track 71, as already mentioned, the illustrated embodiment is provided on the one hand with a recording head 73 for the pilot signal 26 and on the other hand with an erase head 74 which trails behind the recording head 73 as seen in the running direction of the film. Both heads in this case are controlled by the counting mechanism 16. The method of operation of this system will be explained subsequently by reference to FIGS. 13A to 13C the only difference being that according to FIG. 12 the erase head is a permanent magnet erase head 74 which is moved into and out of the operating position by mechanical means through a solenoid 75, whereas in FIGS. 13A to 13C an electromagnetic erase head 74a is provided which is connected to or disconnected from the erase signal oscillator 34 by means of a switch 76 instead of by means of a solenoid 75. The said switch 76, or a second switch 77 connected in the circuit of the erase head 73, is controlled by the counting mechanism 16 in a manner which is analogous to that described by reference to FIGS. 8 to 10.

According to FIG. 13A, the switch 77 is first closed and thus the pilot signal from a pilot signal generator 78 is supplied to the recording head 73. At this time the switch 76 is open and the erase head is therefore not in operation.

The pilot signal 26 is then recorded until the zero position of the counting mechanism 16 or the beginning of the sound sequence 19 is reached. This moment of time is illustrated in FIG. 13B. The switch 77 is then opened by the counting mechanism, so that the pilot signal 26 cannot be recorded into the region of the predefined sound sequence 19. The switch 76 is however simultaneously closed and the erase head 74 or 74a of FIG. 13B is thus set into operation. Since the erase head trails by a specific distance behind the recording head 73, the pilot signal 26 will be again erased within a predefined length section L (FIG. 13C) as the film continues to run through. If the switch 76 is actually closed simultaneously with the opening of the switch 77 the offset of the erase head 74a with respect to the recording head 73 must be precisely equivalent to the length of the predefined length section L. A corresponding different offset may be selected if there is a difference in the timing of the operation of the two switches 76, 77, which may be important in some circumstances for reasons of space.

Fading-in or recording of signals is possible only on a scene-by-scene basis with the counting mechanism systems described so far, convenient observation of the transitions being made possible by the undisturbed film transport. However, since it is frequently required to fade-in only music between the predefined original sound recordings 18, 19 it is desirable for the said music to be faded-in continuously from a sound medium, for example a recording disc, while the film 6 runs and for the said music to be faded-in only at the required places. Setting to music can thus be accomplished more rapidly and more simply. It has already been mentioned that this problem can be solved with the pilot signal 26 or 26a. Whether the space for the sound sequence which is to be faded-in is marked by a positive pilot signal 26 or by a negative pilot signal 26a i.e. by the presence or absence of a pilot signal depends merely on whether this signal is to be erasable, whether the compensating track 72 of the film 6 can be used to that end or whether the original sound scenes 18, 19 are to be marked already in the camera by means of a pilot signal generator and a corresponding recording head provided therein. The use of a signal 26a will probably be preferred in the last-mentioned case but such signal cannot be readily erased if it is recorded together with the original sound recording of the sound track 71. This disadvantage can be avoided by using the compensating track 72 for the pilot signal but the pilot signal may also not be readily erasable if the compensating track 72 is also to be used for transcribing the sound 25 which is to be faded-in, as already described by reference to FIG. 7. Finally, it is possible and feasible to employ a separate signal medium, for example a magnetic tape, for recording the pilot signal. The erase head 32 (FIG. 7) which is in any case already provided can be switchable to playback for reading the said pilot signal. Since reading of the pilot signal does not call for a high degree of quality, this procedure can be readily adopted.

Another solution of the same problem, namely the continuous fading-in of pieces of music, is possible in the arrangement illustrated in FIG. 14. As before, parts with the same function have the same reference numerals as in the previously-described Figures. An output signal which corresponds to the relevant state of the counting mechanism 16 can be picked off from a changeover switch 79. The switch arm 80 of this changeover switch can be connected, as shown, to a contact 81 which reads the counting mechanism data into a store 82 or it can be connected to a contact 83 to enter the counting mechanism state into two comparison stages 84, 85.

In operation, the changeover switch 79 is first moved into the position shown in FIG. 14 and the film 6 is allowed to run through the projector. It is advantageous if the projector is provided with a slow motion device so that the user is able to follow the reproduction of the film readily and without delay and is able to trigger switching operations, for example including the erasing of individual sound places, at places desired by him. While the film runs, the user determines the places at which the original sound is to remain, i.e. he determines the place from which erasing is to proceed and the place from which erasing is to be interrupted. In accordance with the illustrated embodiment, the user operates a switch 86 at the boundary places so that the relevant counting mechanism state at this boundary place is recorded in the store 82. At the end of the film performance the store 82 will contain an entire series of counting mechanism states, each of which corresponds to one boundary place.

The switch reed 80 of the changeover switch 79 is then applied to the switch contact 83, the counting mechanism 16 is again brought into the starting position and the film 6 is again allowed to run through. The state of the counting mechanism 16 is compared with the data in the store 82 in the comparison stage 84 the output of which controls the erase head 32 through a flip-flop circuit 87, the erase signal oscillator 34 being alternately connected to the erase head 32 or being disconnected therefrom. The places on which the sound sequences 25 are to be recorded are thus cleared of any undesirable noises.

A similar comparison takes place in the comparison stage 85 the circuit of which however is provided with a device 88 which ensures that the switch-off device 10 is switched on at the correct time. According to the circuit shown in FIG. 14, space for fading-out can be obtained by the provision of an adding stage which adds a constant number, corresponding to the predefined length section L, to the state signalled by the counting mechanism 16, so that coincidence of the state of the counting mechanism 16 with one of the sets of data of the store 82 is simultated to the comparison device 85 before the next original sound sequence 19 is reached. It is of course not absolutely necessary to connect an adding stage 88 to the output of the counting mechanism 16, instead it is possible to achieve the same result by connecting a subtracting stage between the store 82 and the comparison device 85. FIG. 14 shows the means of controlling the recording head 11 which directly records the signals of the sound sequence 25 but it is obvious that the recording of a pilot signal 26 is also possible by these means should this be deemed desirable for any reason.

FIG. 15 shows a simplified embodiment of a counting mechanism which is suitable for the purpose of the present invention. In the simplest case, it can be merely a disc counter with a disc 89 which can be driven, for example by the main spindle 2 of the projector. The disc 89 is provided with a scale 90 of which FIG. 15 merely shows a section which is visible, for example in a window 50a, indicated by dash-dot lines, with a pointer 91. The counting mechanism disc 89 rotates with a wiper contact ring 92, a wiper contact 93 in the circuit of a switch-off circuit with the fade-out device 10 bearing constantly on the inner ring of the said wiper contact ring. A further wiper contact 95 is situated radially outwardly in the path of a slip ring sector 94. The sector 94 reaches the wiper contact 95 when the counting mechanism is set to approximately "20", the counting mechanism displaying the number of frames which are still missing before the zero position is reached. This difference corresponds to the predefined length section L. As soon as the sector 94 reaches the wiper contact 95 the circuit of the switch-off device 10 will be closed and fading-out can commence.

FIGS. 16 to 18 show embodiments which are feasible in practical terms. An operating mode selector switch 96 is shown in addition to the counting mechanism 16 with the counting mechanism spindle 15, situated transversely to the main spindle 2 of the projector, the feed devices 5, 7 and 8, the magnet heads 11 and 32, a fade-out device 101 and the recording button 24. The said operating mode selector switch 96 conventionally controls the pinch roller 8, which is supported on a lever 97, and a ratchet linkage 98 for latching the recording button 24 in the recording position. The said ratchet linkage 98 co-operates with a ratchet lever 99 which is pivotably supported on a pin 100, directly on the recording button 24, and normally bears under the action of a spring 102 against a stop pin 101 of the button 24.

When the recording button is pressed from the playback position shown in dash-dot lines, into the recording position shown in solid lines, the underside of the ratchet lever 99 will slide along a ratchet bar 98a of the linkage 98 until it is able to drop behind the said linkage and thus retains the recording button 24 in its recording position. A switch stack 105 of a changeover switch is simultaneously reset in the course of this motion by means of a Bowden cable 103 and a rod 104, a first pair of switch reeds 106 associated with the said changeover switch connecting the magnet head from a conductor 107 for the playback amplifier to a further conductor 108 which can be connected to a socket, for example to the recording socket 9, not shown (see FIG. 1A). The erase head 32 is connected to the erase signal oscillator 34, not shown, through a second pair of switch reeds 109.

The projector has a second button 110 with a plurality of cam surfaces. As shown in the sectional view or in side elevation, the button 110 can be moved from the illustrated inoperative position, initially against the action of a helical spring 111, until it strikes a stop plate 112. In the course of this motion a finger 113 of a zero resetting lever 115, which is repeatedly offset and can be pivoted about an axis 114 which is fixed with respect to the apparatus, slides upwardly on a cam 116 of the button 110, the zero resetting lever 115 being pivoted in the anti-clockwise direction about the axis 114. The zero resetting lever 115 supports the counting mechanism pinions 117 which are normally provided on a roller counter and are disengaged by the pivoting motion of the zero resetting lever 115 so that the individual rollers of the counting mechanism 16 are able to move freely. For each counting mechanism roller one arm 118 of the zero resetting lever 15 simultaneously pivots against each cardioid cam 119, connected to the associated counting mechanism roller, so that all rollers of the counting mechanism 16 are set to "zero" in known manner.

If the button 110 is again released after the zero resetting lever 115 is operated, it will return into the illustrated inoperative position. The button 110 can however also be moved into another position. The stop plate 112 is situated in a cage 120 which contains a second helical spring 121, appropriately of larger dimensions than the spring 111. The helical spring 121 presses the stop plate 112 against flanged portions 122 of the cage 120 which limit the motion of the stop plate 112 but are so constructed as to allow the cam surfaces of the button 110 to enter into the cage 120 when the button 110 is moved against the action of the two springs 111, 121. In the interests of clarity the cage is not shown in FIG. 16.

Further cams of the button 120 will come into action if it is depressed against the action of the spring 121 while displacing the stop plate 112. A cam surface 123 which is provided on the underside of the button 110 and has sloping surfaces on both sides strikes against an arm 124 of the ratchet lever 99 and raises it briefly. This ensures that the recording button 24 cannot remain in its recording position when the button 110 is operated but initially regains its playback position.

A ratchet nose 125, a side view of which corresponds approximately to a right-angled triangle, is also provided and has a sloping surface 126 followed by a nose surface 127. The ratchet nose 125 is resiliently connected to the body of the button 110 and can be depressed into an indentation 128 against the action of the spring. For example, the ratchet nose 125 comprises a tongue which is integrally injection-moulded with one half of the button 110, the spring action resulting from the resilience of the plastics material itself. When the button 110 is displaced against the action of the spring 121, a ratchet lever 130, which is supported on a spindle 120 that is fixed with respect to the apparatus, moves on to the slope 126 of the ratchet nose 125 to thrust the latter into the opening 128. However, as soon as the nose surface 127 has passed by the ratchet lever 130, the ratchet nose 125 will again move resiliently out of the opening 128, the ratchet nose 127 simultaneously bearing on the ratchet lever 130 and thus retaining the button 110 in the completely depressed position.

If operation of the button is found to be an error, the button need merely be rotated into the position shown in dash-dot lines in FIG. 16, the ratchet nose 125 being pivoted past the end of the ratchet lever 130 so that the button 110 can then be moved back into the inoperative position under the action of the springs 111, 121.

The button 110 finally has a stop abutment 131 which operates a changeover switch 132, not shown in FIG. 16 in the interests of clarity, when the button 110 is moved against the action of the spring 121, the said changeover switch moving from the illustrated position for normal recording into the other position in which the fade-out device is connected in circuit and can thus perform fade-out operations during recording.

As already described by reference to FIG. 5, the film is transported until the next predefined sound sequence 19 begins. This can be done by switching the mode setting switch 96 to forward ("VL"). The switch 96 is then reset into its inoperative position "0" and the beginning of the scene can be exactly defined by means of the rotary single-frame knob 3. The button 110 is then completely depressed so that first the counting mechanism 16 is moved into its zero position and the button 110 is then latched. The switch 96 is then set to reverse run ("RL") and the film 6 is transported until the end of the preceding predefined sound sequence 18 is reached. The central switch 96 can then be returned into its inoperative position and the end of the preceding scene can be exactly defined where appropriate by means of the rotary single-frame knob.

If the counting mechanism is not constructed in accordance with FIGS. 19 to 22, in which case recording can commence by a "flying" start, the recording button 24 can be set into its recording position against the action of a compression spring 133 in addition to the button 110 which has already been depressed, the Bowden cable 10.3 and the rod 10.4, which is biased by the action of a relatively weak spring 134, moving the switch stack 10.5 into the illustrated position.

If the switch 96 is then moved into the position shown in FIG. 16, the pinch roller carrier 97 will pivot about its axis 135 in the anti-clockwise direction under the action of a spring 136. The pinch roller 8 is thus thrust against the film 6 and the driving spindle 7. A switch 137 in the circuit containing the fade-out device 10 is simultaneously closed. Setting the central switch 96 into the illustrated position engages the film transport and the film 6 begins to run forward, i.e. it is transported in the direction of the arrow drawn on the sprocket 5, in FIG. 16. The sound sequence 29 is gradually faded-in since the recording circuit was closed through the switch 137.

The film 6 continues to be transported until a tracing lever 43a (corresponding to the lever 43 of FIGS. 8 and 10) drops into the associated cam indentation 51 and thus opens the switch 52 which is connected in series with the switches 132 and 137. The fade-out device 10 is thus set into operation and remains in this state until a cam follower 57a on the lever 130 drops under the action of a spring 138 into the cam indentation 58 of the counting mechanism roller 42. The lever 130 will pivot in the anticlockwise direction about the axis 129 to release the ratchet nose 125 so that the button 110 is able to return under the action of its spring 111, 121 into the inoperative position. In the course of this movement of the button 110 the cam 123 pivots the arm 124 of the lever 10.8 against the action of the spring 102 so that the lever 10.8 pivots about the axis 100 in the clockwise direction in such a way as to be lifted over the rod 98a and the recording button 24 is able to return under the action of the spring 133 into its playback position so that the apparatus clearly indicates the scene change while the film transport is uninterrupted. With the return of the button 110 into its inoperative position, the changeover switch 132 is also moved into its original position shown in the drawing.

Since the recording button 24 and the central switch 96 together form the operating mode selector switch device, the transmissive connection between the counting mechanism 16 and the button 110 with the cam 123 forms a kind of "latching device" between the counting mechanism and the operating mode selector switch. The latching action could also be obtained by the central switch 96 being latched in the relevant position against the force of a restoring spring which biases the switch in the direction of its "0" position or into a playback position, the latching being released by the counting mechanism 16 in a manner analogous to that described above.

Since on the one hand the lever 99 is biased by the action of the spring 102 and on the other hand the recording button is biased by the action of the relatively strong spring 133, the forces to be overcome in the return of the button 110 from the cam 123 may be relatively large. It may therefore be desirable to incorporate a mechanical relay into the transmission system relating to the above, as described sequentially by reference to FIGS. 17 and 18.

In this case a tracer lever 130a and a ratchet lever 130b are provided in place of a single lever 130. After depressing the button 110, the tracer lever 130b drops into a ratchet recess 127a corresponding to the ratchet surface 127 in FIG. 16 and retains the button 110. The tracer lever 130a on the other hand is provided with the cam follower 57a which co-operates with the cam surface 51 associated with the roller 42 of the counting mechanism 16. An actuating lever 138, which is pivotably supported by means of a bore 139 on a bearing pin 140, is additionally provided. The actuating lever 138 bears under the action of a torsion spring 141 (FIG. 18) on a stop abutment 142. The diameter of the bore 139 is slightly larger than the diameter of the bearing pin 140 so that the operating lever 138 can be moved into the position shown in broken lines in FIG. 17. The lever will normally be in this position for as long as the tracer lever 130a, the construction and operation of which correspond substantially to that of lever 55 (FIGS. 8 to 11), is unable to drop into the indented cam surface 51 of the roller 42, during which time a projection 143 of the lever 130a displaces the actuating lever 138 into the position shown in broken lines.

The actuating lever 138 is biased by the action of a plate spring 144 which applies load to the lever in the direction of its position shown in solid lines. Due to the presence of the plate spring 144, the tracer lever 130a is also thrust via the actuating lever 138 against the cam surface of the roller 42.

At least one actuating wing 146 is mounted on a sleeve 145 on the main spindle 2 of the projector. When the main spindle 2 is in operation, the actuating wing 146 corotates therewith. If the actuating lever 138 is in the position shown in broken lines in FIG. 17, it will be positioned outside the path of the actuating wings 146. As soon as the counting mechanism 16 reaches its zero position, i.e. when the tracer lever 130a together with its cam follower 57a has dropped into the indented cam surface 51, the actuating lever 138 will move under the action of the plate spring 144 into the position shown in solid lines in FIG. 17, in which said position it will be situated directly in the path of the actuating wings 146. The actuating lever 138 is thus gripped by the next passing actuating wing 146 and pivoted from the position shown in solid lines in FIG. 18 into the position shown in broken lines in which said position the lever thrusts by means of its sloping surface 147 on the two levers 124 and 130b. The arm 124 of the lever 99 is thus pivoted clockwise with respect to FIG. 17 so that the recording button 24 is unlocked and is able to return into its playback position under the action of the spring 133 which is not shown (FIG. 16). The ratchet lever 130b is simultaneously pivoted by the sloping surface 147 in the anticlockwise direction about its axis 129a and against the action of the spring 138a, which loads the lever, so that the button 110 is released and is able to return into its inoperative position under the action of its spring 111, 121 (FIG. 16) which is not shown.

Numerous different embodiments are feasible within the scope of the invention. For example, in a device according to FIG. 13C the erase head 74a can be switched off either by a further cam surface of the counting mechanism 16 or by means of a timer after a predefined time has elapsed. As already mentioned, it is advantageous if a switching device of the kind described hereinbelow is combined with the counting mechanism 16, shown in simplified form in the interests of clarity. Stores other than an electronic store 82, for example in the form of a magnetic tape or the like, are also possible. This does not preclude the compensating track 72 itself being employed for storing the appropriate data. The action of the adding stage 88 can be achieved by offsetting the appropriate reading head.

The counting mechanism 16a which is illustrated in FIGS. 19 to 22 is provided with a drive spindle 304 which is associated according to FIG. 19 through a transmissive connection 374 to a driven element of the projector 1, for example to the gear drum 5 (see also FIGS. 4A, 4B).

The numerals 301 and 302 refer to the side cheeks of a frame or casing which is not otherwise illustrated. A spindle 15 is supported in the said side cheeks at approximately half their height. Three spindles 303, 305 and 306 (see FIG. 21) are provided above the spindle 15 and parallel thereto at the same height. The rotatably supported spindle 304 also extends through the side cheeks below the spindle 15.

The counting mechanism rollers 39 - 41 are loosely supported on the spindle 15 but the roller 42 is fixed, conventional unit of ten indexing devices 308 being provided between the rollers 39 - 42. A cardioid cam 309 is fixedly connected to each counting mechanism roller 39 - 42 for zero setting the appropriate counting mechanism roller in known manner.

To drive the said counting mechanism 16a the counting mechanism roller 42, corresponding to the lowest digit, is fixedly connected through the spindle 15 to a gearwheel 310 which is mounted on the spindle 15. A gearwheel 311 is loosely supported on the shaft 304 which is driven by the projector drive. The said gearwheel 311 meshes with an intermediate gear 312 which in turn meshes with the gearwheel 310. The intermediate gear 312 is rotatably supported on a lever 313' which in turn is pivotably supported on the shaft 304. The lever 313' is biased towards the spindle 15 by a spring 314 and the said spring compels engagement of the intermediate gear 312 with the gearwheels 310 and 311 (FIG. 3). A stop abutment 315 for the lever 313' limits the pivoting motion thereof. Additional levers 13", disposed between the counting mechanism rollers 39 - 42 and orientated towards the cardioid cams 309, are fixedly connected to the lever 313' by means of a bridge 316 that is supported on the spindle 304 (FIG. 1). Wedge-shaped projections 317 are situated at the ends of the lever 313". When the levers 313" are pivoted in the clockwise direction by operation of the lever 313' in the direction of the arrow 318 (FIG. 21), the raised portions 317 will act upon the cardioid cam 309 to cause the latter to rotate in known manner and therefore also cause the counting mechanism rollers 39 - 42 to rotate into a specified position, i.e. in the present case into the zero position. This is made possible by the intermediate gear 312 being disengaged while the lever 313' is pivoted.

A gearwheel 319 is fixedly connected to the spindle 304 in a position adjacent to the gearwheel 311. A friction clutch 320 is located between the two gearwheels 311 and 319. The gearwheel 311 is thus driven by the spindle 304 through the said friction clutch 320.

A gearwheel 321, fixedly connected to an eccentric disc 322, is loosely mounted on the spindle 15. The gearwheels 319 and 321 are coupled to each other through an intermediate gear 323 (FIG. 20) which in turn is supported on a second pivoting lever 324, situated on the spindle 304, the said pivoting lever in turn being biased by a spring 325 (FIG. 20) in the clutch engagement direction.

The eccentric disc 322 can thus be directly driven by the spindle 304. The otherwise circular circumference of the said disc is provided with a raised portion 322'. The gearwheel 321 incorporates a circumferential place 321' without teeth to interrupt further drive by the intermediate gear 323.

Compared to the transmission ratio between the gear train 319, 323, 321 and the eccentric disc 322, and the transmission ratio of the gear train 310, 311, 312 in relation to the counting mechanism roller 42 is designed so that the said roller 42 rotates faster than the eccentric disc.

The eccentric disc 322 supports a stop abutment 326 which projects in the axial direction and is associated with a stop abutment 327, mounted on the cheek 302, for the purpose to be described below. A helical spring 328, which is wound around the spindle 15, bears by means of its end members on the stop abutments 326, 327 (FIG. 20) to function as a restoring spring.

Near the limiting position of the lever 324, in which said position the intermediate gear 323 is coupled to the gearwheels 319 and 321, the free end of said lever bears on a push-button 331 (FIG. 20A) which is slidably supported by means of a rod 330 on a stationary wall 329 of the frame or casing 301, 302 and is thrust away from the wall 329 by a spring 322. The push-button 331 has a rear conical circumferential surface 333, a step 334 which adjoins the latter in the forward direction and a frontal cylindrical part 335. In the position shown in FIGS. 20 and 20A the lever 324 is situated in front of the step 334 and with slight clearance on the cylindrical part 335 so that the gearwheels 319, 321, 323 are correctly engaged.

The arrangement disclosed in FIGS. 20 and 20A operates as follows: if the spindle 304 is driven in the sense of the arrow R (FIG. 20) when the components are in the position as shown, the eccentric disc 322 will also begin to rotate in the sense of the arrow R when the push-button 331 is depressed and the spring 328 will be stressed. Rotation against the direction of the arrow R however causes the torque transmitted in the gear train 319, 323, 321 to pivot the lever 324 outwardly against the force of the relatively weak spring 325 as soon as the two stop abutments 326, 327 strike upon each other so that the end of said lever is deflected from the step 334 of the push-button 331 and the latter therefore springs forward due to the action of the spring 332 (FIG. 20A) so that the lever 324 slides upwardly on the conical part 333 of the push-button 331. The gear train 309, 323, 321 is interrupted simultaneously with the outward pivoting of the lever 324 and under the action of the spring 328 the eccentric disc 322 returns into its illustrated starting position in which the stop abutments 326, 327 touch each other with their other sides.

Depressing the push-button 331 causes the lever 324 to be again latched at the step 334 and thus establishes the illustrated basic position (FIG. 20) so that the cycle described above is repeated when the spindle 304 is continuously driven.

A bar 337 is supported between the cheeks 301 and 302 on the spindle 305 and supports a radially projecting arm 338 with a tracer nose 339 which can bear on the circumference of the eccentric disc 332 to which end the arm 338 is biased by a spring 340 (FIG. 20).

The lever 55' (see FIGS. 8 - 10) is supported on the spindle 306 and the lever 43' is supported on the spindle 303. By contrast to the counting mechanism according to FIGS. 8 - 10, the levers 43', 55' trace the counting mechanism rollers by an offset of one numeral, the lever 43' supporting the cam followers 46 - 48 which are indicated in dash-dot lines in FIG. 19 while the lever 55' on the other hand supports the cam followers 56a, 56b, 56 and 57. The lever 43' therefore traces the same cams 49 of the rollers 39, 40 which are traced by the lever 55' but traces the cam surfaces 51 on the roller 41.

The switches 52, 54 which bear by means of tracer pins 349 or 350 on the levers 43, 55 are mounted by means of levers 43', 55' on the beam 337.

If the tracer nose 339 of the arm 338 is situated on the circular circumferential track of the eccentric disc 322, the beam 337 will be pivoted in the anti-clockwise direction (refer to FIG. 20) by the spring 340 and the switches (52, 54) will be pivoted away from the levers 43', 55' so that the switches are in every case open. If the tracer nose 339 moves on to the raised portion 322' of the eccentric disc 322, the switches 52, 54, will be pivoted towards the levers 43', 55' and will be closed through the tracer pins 350 or 349. The switches remain closed until the levers 43', 55' drop into the appropriate cams 49, 51, 58 of the counting mechanism rollers 39 - 42.

FIG. 22 shows in diagrammatic form the circuit with the switches 52, 54 which are controlled by the above-described counting mechanism 16a. The operation of the switch stack 10.5 in conjunction with the recording button 24 is already described by reference to FIGS. 16 – 18.

The method of operation of the apparatus according to FIGS. 19 – 22 will now be described by reference to FIG. 5. The operation remains the same as far as the return run in the sense of the arrow 22. The projector will then however be stopped when the counting mechanism is at X and the push-button 335 is depressed. This results in the previously described engagement of the gearwheel 323 which drives the eccentric disc 322 via the gearwheel 321. Renewed return run for a few seconds in accordance with the arrow 22a in broken lines causes the gearwheel 321 to be rotated in the direction R.

The extent of this return run could be visible in a projector window, a mark, for example a red mark, becoming visible on the disc 322. If the projector were allowed to reverse excessively the notch 321' would move into the region of the gearwheel 323, thus stopping further motion of the gearwheel 321 and preventing the device from being destroyed. However, synchronism would be lost in this case and the last procedure would have to be repeated.

The spring 328 is wound up during the return run in accordance with the arrow 22a. If the projector is stopped after the return run, the sound recording button 24 will have to be depressed. The projector is subsequently set to forward run. No recording takes place during the seconds in which the projector transmission runs up to speed because the tracer nose 339 of the bar 337 bears upon the cylindrical part of the eccentric disc 322 and is therefore raised and the two switches 52, 54 are therefore open. It is only when the counting mechanism state X is regained that the cam 322' causes the lever 337 to be pivoted in the anti-clockwise direction and both switches 52, 54 are therefore closed. When the counting mechanism reaches the state X, the stop abutment 326 will also reach the stop abutment 327, which is fixed with respect to the housing, thus preventing further rotation of the gearwheel 321. The torque applied by the gearwheel 323 in this direction of rotation results in clockwise outward pivoting of the lever 324 so that the push-button 35 is unlocked. The sloping portion 333 causes further outward pivoting of the lever 324 so that the gearwheel 323 cannot scrape along the gearwheel 321 and thus cannot produce a noise. The eccentric disc 322 is then stationary while the film continues to be transported in the sense of the arrow 23 (FIG. 5). At a predefined length L prior to reaching the counting mechanism state "0", the lever 43 drops into the grooves 49, 51 of the counting mechanism rollers 39 – 41, the switch 52 is opened and the beginning of the fade-out operation is initiated. This takes place at a specific state of the counting mechanism, for example "9997", because the illustrated arrangement of the levers 43', 55' permits a longer groove 51 or a longer fade-out over a longer length L than would be possible in the example according to FIGS. 8 – 10. The erase head 32 is still in operation due to the closed switch 54 so that erasing continues until the counting mechanism reaches "0000" when the lever 43' is again raised but the lever 55' drops into the grooves 49 of the rollers 39, 40 as well as into the grooves 58 of the rollers 41, 42 at "0001". On the one hand this interrupts the erase function, on the other hand the actuating lever 138 is moved into the path of the actuating wing 146 by means of an arm 143a of the lever 55', corresponding to the lever 130a with the projection 143 of FIG. 17, by analogy with FIGS. 17, 18. The recording button 24 is then returned into its playback position (broken lines in FIG. 22) in the manner already described by reference to FIGS. 17, 18 so that recording becomes impossible despite the switch 52 being closed.

To prevent the switch 54 being reclosed when operation continues, the counting mechanism can also be stopped in this case in the "0001" position. The friction clutch 320 is advantageous to this end. Changeover to "playback" on the other hand offers the advantage that the remaining original sound 58 is immediately audible when the apparatus continues to run.

As an alternative and according to FIG. 23, the arm 143a can first actuate a lever 138a which is pivotable about an axis 140a. If the cam followers of the lever 55' drop into the grooves of the counting mechanism rollers and if the lever therefore pivots about the axis 306 in the clockwise direction, it will move the lever 138 against the force exerted by a relatively weak spring in the anti-clockwise direction about its axis 140a until one pawl 147a of a ratchet lever 147 drops into a ratchet 138b, which is provided on the lever, and initially retains it in this position.

The actuating lever 138 is supported on the pivot 140 carried by the lever 138a, the left hand of said actuating lever moving into the region of the actuating cam 146a when the lever 138a and the pawl 147a are latched, the said cam being formed so as to provide a comparatively smooth rise. The cam 146a causes the actuating lever 138 to pivot about the pivot 140 in the clockwise direction so that a pawl 130', formed on its right-hand end (corresponding to the nose 127 of FIG. 16A), releases a ratchet nose 127 of the button 110 (where such ratchet nose can also be constructed by analogy to FIGS. 16, 16A). The button 110 is then moved to the right by the spring 121 which is schematically indicated.

Pivoting of the actuating lever 138 in the clockwise direction in order to release the button 110 causes the pawl end 138' to strike an arm 147b of the ratchet lever 147 so that this is briefly pivoted in the clockwise direction. It releases the ratchet 138b of the lever 138 which returns under the action of the spring 148 into the position shown in FIG. 23 because in the meantime the counting mechanism 16a will have continued its rotation and the lever 55' assumes the position illustrated in FIG. 23.

The advantage of this arrangement is that the lever 138 is not subjected to any sudden stresses because the cam 146a can be constructed so as to rise gently. A further advantage is in the return of the lever 138a after the button 110 is released, thus avoiding the formation of noise.

What we claim is:

1. A recording apparatus for a tape-like data medium in which a sound sequence is recorded in gaps between sections of the data medium carrying an original sound recording without removal of the original recording, said apparatus comprising a record head, an erase head, data medium transport means for selectively driving the data medium in a forward or a reverse direction, mode setting means for the setting of the operating mode of the apparatus in either a record mode or a playback mode, and at least one counting means for actuating the mode setting means after a preset data medium length has run through wherein said counting means comprises means for producing a signal for switching on at least one fading device means at a predetermined data medium length prior to the end of one of said gaps between sections of the data medium carrying said original sound recording, said fading device means for selectively fading-in or fading-out a portion of said sound sequence in said one of said gaps between sections of the data medium carrying an original sound recording.

2. Recording and playback apparatus as claimed in claim 1 in which said fading device means controlled by said counting means is connected in the circuit of an amplifier, wherein the the portion of said sound sequence, to be introduced in said one of said gaps between the two sound sections bearing the original recording during playback is controllable by the counting means.

3. Apparatus as claimed in claim 2, further comprising a changeover switch means for selectively enabling the counting mechanism means to control the playback amplifier or a signal which is supplied to the recording head.

4. Apparatus as claimed in claim 3 in which the counting means incorporates a switch device means for switching off at least a control part of the counting means when the erase head is switched off, wherein said erase head and a stopping device are arranged to be switched off by the changeover switch means in said playback mode.

5. Apparatus as claimed in claim 1 wherein the counting mechanism controls the erase head of the apparatus via the fading device or the switch device.

6. Apparatus as claimed in claim 1 in which the counting mechanism means for controlling the fading device means is associated with at least one cam traced by a cam follower for actuating the fading device means.

7. Apparatus as claimed in claim 6, in which the switch device means for the counting mechanism comprises an end stop which is formed in the region of the cam part that switches off the erase head and corresponds to a mating stop on the cam follower.

8. Apparatus as claimed in claim 7 in which the counting mechanism means comprises an actuating device means for switching the operating mode of said mode setting means, said counting mechanism means controlling a clutch transport means coupling said actuating device means to said tape for transmitting power to actuate the mode setting means.

9. Apparatus as claimed in claim 1, in which an optical indicating device means for indicating the presence of said sections of the data medium carrying an original sound recording is connected to the playback head.

10. Apparatus as claimed in claim 1, further comprising means for recording a pilot signal on the data medium, wherein said means for producing a signal for switching controls the means for recording a pilot signal.

11. Apparatus as claimed in claim 10, in which the means for recording a pilot signal is switchable by the counting mechanism means in a switch device, and the fading device means is switchable towards the end of recording of the additional sequence.

12. Apparatus as claimed in claim 10, in which the means for recording a pilot signal includes a magnetic recording head for the pilot signal and an erase head which trails relative to said recording head, said magnetic recording head is connected to a pilot signal oscillator which the full preset tape length runs through, the erase head is controlled by the counting mechanism means for the purpose of erasing the end portion of the recorded pilot signal.

13. Apparatus as claimed in claim 1, in which the counting mechanism means is associated with a storage device means for numerical storing of at least one preset tape length, means for supplying an output signal of the storage device means to one input of at least one comparison device means for comparing the actual state of the counting mechanism with the predefined numbers of the storage device means, a second input of the comparison device means being connected to the counting mechanism means.

14. Apparatus as claimed in claim 1, in which said counting mechanism means comprises a mechanical counting mechanism and the means for producing a signal comprises a cam track driven together with the mechanical counting mechanism provided with a switch surface means for actuating a first switch, said first switch connected to the fading device means.

15. Apparatus as claimed in claim 14, in which an AND circuit is provided for actuating a second means for producing a switching signal, the said second means connected in the circuit of a second erase head, wherein said second means can be actuated only after operation of the first means for producing a switching signal switch and after the counting mechanism means has reached a predefined position.

16. Apparatus as claimed in claim 1 further comprising at least one optical indicating device means for indicating the circuit state of the counting mechanism and actuated together with said means for producing a switching signal.

17. A recording apparatus for a tape-like data medium in which a sound sequence is recorded in gaps between sections of the data medium carrying an original sound recording without removal of the original recording, said apparatus comprising, at least one electromagnetic signal transducer, a data medium transporting device capable of driving the data medium in a forward or reverse direction, mode setting means for setting the operating mode of the apparatus in a record mode or a reproduction mode and at least one counting means for actuating the mode setting means after a preset tape length has run through, means for introducing a portion of said sound sequence in one of said gaps between two predetermined sections of the data medium carrying an original recording, said mode setting means actuating by said counting means, wherein said mode setting means comprises a switch device for controlling the operation of the signal transducer, without disturbing the tape transport device.

18. Apparatus as claimed in claim 17, in which said signal transducer is an electromagnetic erase head means for receiving an erase signal from an erase oscillator.

* * * * *